United States Patent [19]
Hennessey et al.

[11] Patent Number: 6,014,461
[45] Date of Patent: *Jan. 11, 2000

[54] APPARATUS AND METHOD FOR AUTOMATIC KNOWLEGE-BASED OBJECT IDENTIFICATION

[75] Inventors: Audrey Kathleen Hennessey; YouLing Lin; Veera V. S. Khaja; Ramakrishna Pattikonda; Rajasekar Reddy; Huitian Lu; Ramachandra Katragadda, all of Lubbock, Tex.

[73] Assignee: Texas Instruments Incorporated, Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/998,315

[22] Filed: Dec. 24, 1997

Related U.S. Application Data

[63] Continuation of application No. 08/347,020, Nov. 30, 1994, abandoned.

[51] Int. Cl.[7] ....................................................... G06K 9/62
[52] U.S. Cl. ........................... 382/195; 382/218; 382/224
[58] Field of Search ..................................... 382/195, 197, 382/199, 201, 217, 218, 224, 227

[56] References Cited

U.S. PATENT DOCUMENTS

| | | | |
|---|---|---|---|
| 4,509,075 | 4/1985 | Simms et al. | 348/149 |
| 5,048,100 | 9/1991 | Kuperstein | 382/157 |
| 5,436,979 | 7/1995 | Gray et al. | 382/141 |
| 5,515,453 | 5/1996 | Hennessey et al. | 382/254 |
| 5,544,256 | 8/1996 | Brecher et al. | 382/149 |

OTHER PUBLICATIONS

Lin, YouLing, "Techniques for Syntactic Analysis of Images With Application for Automatic Visual Inspection," A Dissertation in Business Administration Submitted to the Graduate Faculty of Texas Tech University in Partial Fulfillment of the Requirements for the Degree of Doctor of Philosophy, Dec. 1990.

*Primary Examiner*—Andrew W. Johns
*Attorney, Agent, or Firm*—Robert L. Troike; Richard L. Donaldson

[57] ABSTRACT

An apparatus and method for automatic knowledge-based object or anomaly classification is provided by capturing a pixel map of an image and from that generating high level descriptors of the object or anomaly such as size, shape, color and sharpness. These descriptors are compared with sets of descriptors in a knowledge-base to classify the object or anomaly.

19 Claims, 24 Drawing Sheets

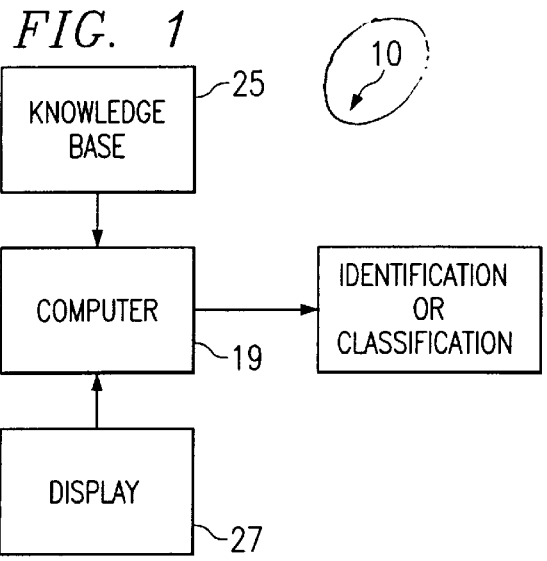
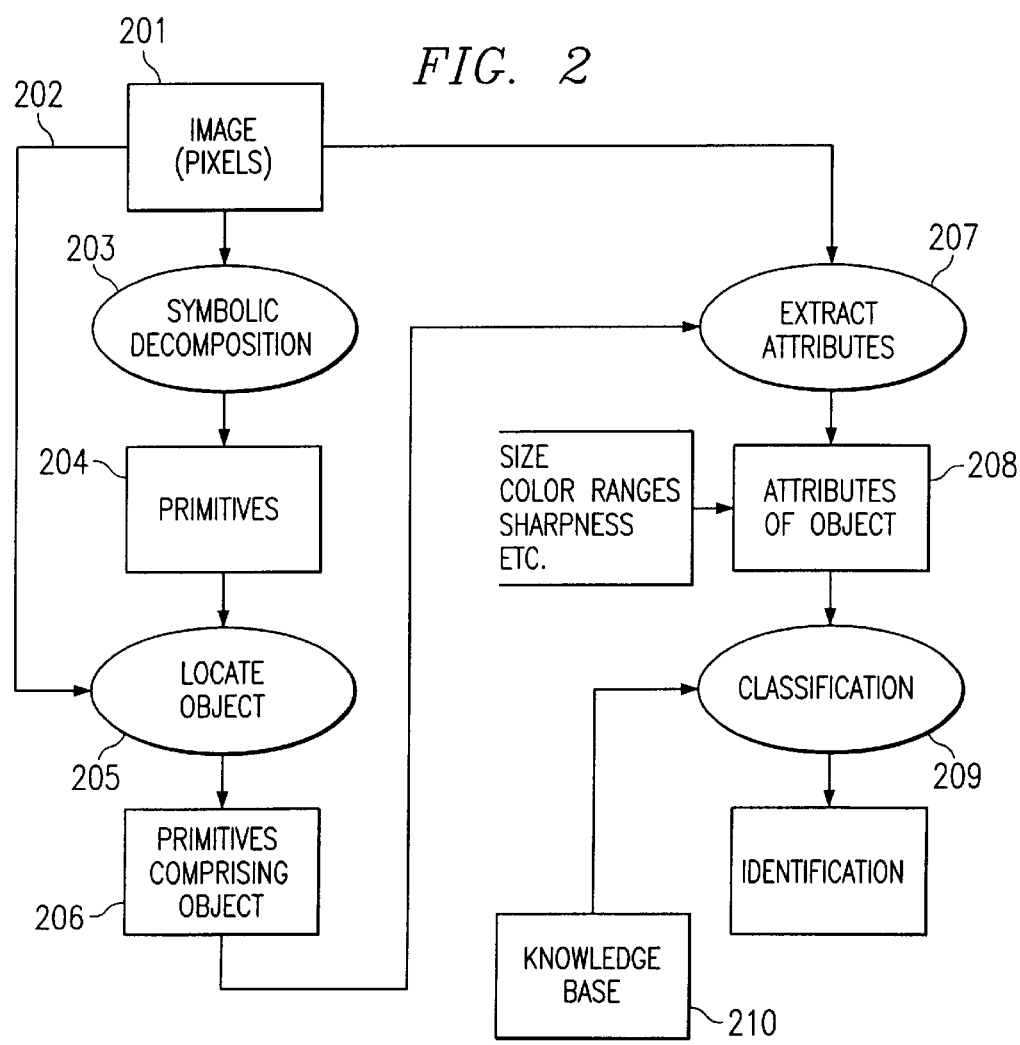

FIG. 3

Mathematical Primitives

| | | | | | | | |
|---|---|---|---|---|---|---|---|
| 101 LINE | sp=(485  25) | ep=(481  23) | d=−2.68 | l= 5 | std= 0.23 | label= 27 | texture=( 31   8) | curvature=(483  24) |
| 102 LINE | sp=(481  24) | ep=(479  20) | d=−2.03 | l= 5 | std= 0.45 | label= 27 | texture=( 28  16) | curvature=(481  22) |
| 103 LINE | sp=( 34  46) | ep=( 29  43) | d=−2.60 | l= 6 | std= 0.22 | label= 28 | texture=( 21  36) | curvature=( 32  45) |
| 104 LINE | sp=( 29  44) | ep=( 22  25) | d=−1.92 | l= 20 | std= 0.45 | label= 28 | texture=( 19  45) | curvature=( 27  35) |
| 105 LINE | sp=( 22  24) | ep=( 14  22) | d=−2.90 | l= 9 | std= 0.38 | label= 28 | texture=( 16  38) | curvature=( 18  23) |
| 106 LINE | sp=( 71  26) | ep=( 74  26) | d= 0.00 | l= 4 | std= 0.50 | label= 29 | texture=( 17  27) | curvature=( 72  26) |
| 107 LINE | sp=( 75  27) | ep=( 74  20) | d=−1.71 | l= 9 | std= 0.43 | label= 29 | texture=( 15  28) | curvature=( 75  23) |
| 108 LINE | sp=( 72  20) | ep=( 72  26) | d= 1.57 | l= 9 | std= 0.80 | label= 29 | texture=( 15  33) | curvature=( 72  22) |
| 109 LINE | sp=(427  22) | ep=(423  23) | d= 2.90 | l= 8 | std= 0.99 | label= 30 | texture=( 19  39) | curvature=(425  22) |
| 110 LINE | sp=(423  25) | ep=(426  24) | d=−0.32 | l= 5 | std= 0.65 | label= 30 | texture=( 22  37) | curvature=(425  26) |
| 111 LINE | sp=( 76  39) | ep=( 77  47) | d= 1.45 | l= 9 | std= 0.35 | label= 31 | texture=( 37  17) | curvature=( 77  43) |
| 112 LINE | sp=( 77  47) | ep=( 67  40) | d=−2.53 | l= 11 | std= 0.27 | label= 31 | texture=( 45  10) | curvature=( 72  44) |
| 113 LINE | sp=( 67  41) | ep=( 62  27) | d=−1.91 | l= 15 | std= 0.96 | label= 31 | texture=( 42   8) | curvature=( 66  34) |
| 114 LINE | sp=( 60  27) | ep=( 61  22) | d=−1.37 | l= 6 | std= 0.26 | label= 31 | texture=( 33  11) | curvature=( 61  25) |
| 115 LINE | sp=( 89  33) | ep=( 87  26) | d=−1.85 | l= 9 | std= 0.69 | label= 32 | texture=( 11  34) | curvature=( 89  29) |
| 116 LINE | sp=( 85  26) | ep=( 84  30) | d= 1.82 | l= 5 | std= 0.28 | label= 32 | texture=(  9  34) | curvature=( 85  28) |
| 117 LINE | sp=( 85  30) | ep=( 88  31) | d= 0.32 | l= 4 | std= 0.26 | label= 32 | texture=( 12  26) | curvature=( 86  31) |
| 118 LINE | sp=(344  23) | ep=(346  31) | d= 1.33 | l= 9 | std= 0.43 | label= 33 | texture=( 13  54) | curvature=(345  27) |
| 119 LINE | sp=(348  31) | ep=(349  24) | d=−1.43 | l= 9 | std= 0.50 | label= 33 | texture=(  9  37) | curvature=(349  28) |

FIG. 16
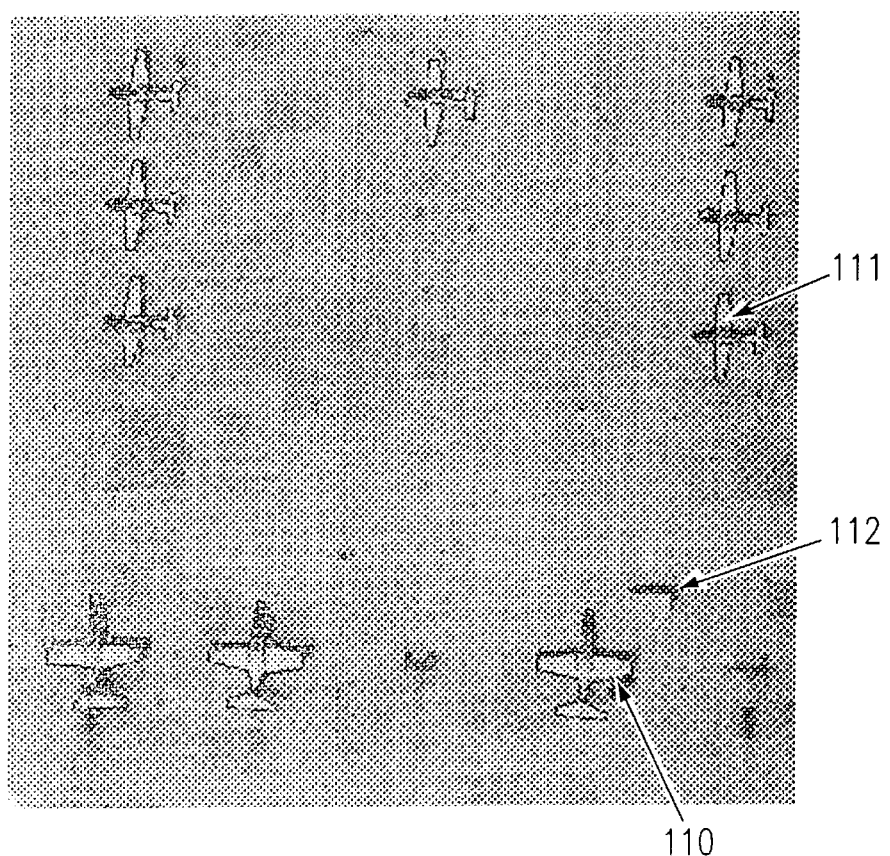
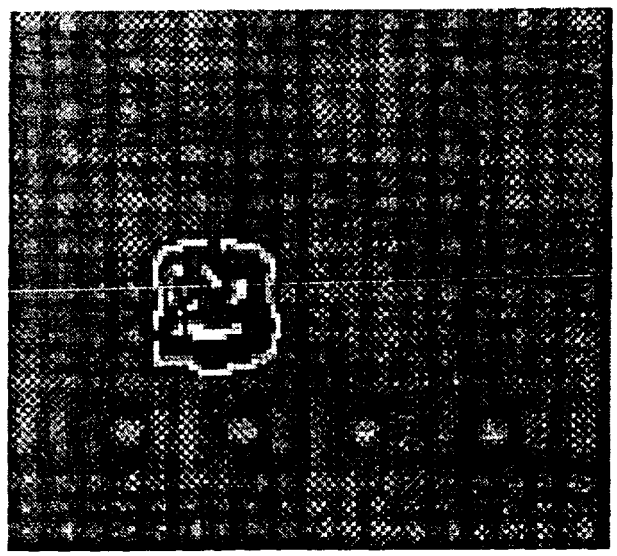
FIG. 19

FIG. 26a

THE VECTORS IN KNOWLEDGE BASE:

| CLASS | METHOD | FILENAME | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| 1 | 5 | 01C.TIF | 42 | 26 | 171 | 27 | 121 | 22 | 1 | 10 | 58 | 13 | 80 | 35 | 24 | 75 | 212 | 10 | 10 | 10 | 80 |
| 1 | 5 | 02C.TIF | 49 | 44 | 154 | 43 | 115 | 90 | 1 | 10 | 85 | 23 | 83 | 15 | 18 | 63 | 214 | 10 | 10 | 10 | 115 |
| 1 | 5 | 03C.TIF | 5 | 100 | 154 | 2 | 50 | 100 | 1 | 10 | 2 | 1 | 77 | 201 | 300 | 77 | 202 | 10 | 10 | 10 | −90 |
| 1 | 5 | 04C.TIF | 48 | 43 | 150 | 59 | 130 | 13 | 1 | 80 | 99 | 17 | 72 | 34 | 15 | 57 | 180 | 20 | 80 | 140 | 130 |
| 2 | 5 | 11C.TIF | 106 | 14 | 163 | 37 | 78 | 206 | 1 | 10 | 47 | 53 | 68 | 1 | 15 | 73 | 218 | 30 | 100 | 40 | 60 |
| 2 | 5 | 12C.TIF | 93 | 50 | 142 | 59 | 113 | 125 | 1 | 10 | 88 | 85 | 50 | 1 | 11 | 56 | 175 | 40 | 110 | 40 | 165 |
| 2 | 5 | 13C.TIF | 99 | 10 | 162 | 34 | 63 | 120 | 1 | 30 | 41 | 50 | 68 | 1 | 17 | 74 | 205 | 40 | 110 | 20 | 65 |
| 2 | 5 | 14C.TIF | 90 | 57 | 126 | 71 | 85 | 150 | 1 | 10 | 102 | 81 | 44 | 1 | 12 | 48 | 175 | 30 | 110 | 50 | 175 |
| 3 | 5 | 65C.TIF | 108 | 58 | 135 | 68 | 86 | 52 | 1 | 10 | 104 | 104 | 43 | 1 | 9 | 50 | 200 | 60 | 110 | 40 | 150 |
| 3 | 5 | 67C.TIF | 123 | 28 | 150 | 41 | 66 | 115 | 1 | 10 | 82 | 77 | 55 | 1 | 11 | 61 | 190 | 110 | 100 | 20 | 80 |
| 3 | 5 | 68C.TIF | 230 | 17 | 170 | 65 | 94 | 112 | 1 | 10 | 78 | 91 | 55 | 1 | 19 | 69 | 222 | 160 | 130 | 10 | 35 |
| 3 | 5 | 69C.TIF | 133 | 24 | 158 | 53 | 62 | 124 | 1 | 10 | 94 | 97 | 49 | 1 | 17 | 60 | 219 | 100 | 110 | 20 | 65 |
| 3 | 5 | 70C.TIF | 71 | 36 | 158 | 55 | 84 | 77 | 1 | 10 | 66 | 62 | 65 | 1 | 16 | 69 | 198 | 20 | 100 | 60 | 100 |
| 1 | 5 | 71C.TIF | 78 | 24 | 165 | 52 | 109 | 42 | 1 | 10 | 48 | 43 | 72 | 1 | 19 | 74 | 210 | 10 | 150 | 140 | 85 |
| 3 | 5 | 72C.TIF | 25 | 100 | 166 | 36 | 41 | 0 | 1 | 10 | 36 | 6 | 81 | 89 | 48 | 77 | 214 | 10 | 10 | 10 | 75 |
| 3 | 5 | 74C.TIF | 115 | 21 | 140 | 71 | 69 | 32 | 1 | 10 | 100 | 106 | 41 | 1 | 11 | 53 | 172 | 70 | 130 | 20 | 70 |
| 3 | 5 | 77C.TIF | 136 | 19 | 145 | 73 | 65 | 74 | 1 | 20 | 105 | 110 | 40 | 1 | 11 | 53 | 186 | 80 | 120 | 20 | 60 |
| 3 | 5 | 78C.TIF | 135 | 29 | 154 | 65 | 50 | 35 | 1 | 50 | 93 | 104 | 46 | 1 | 13 | 60 | 191 | 120 | 110 | 10 | 30 |
| 6 | 5 | 85C.TIF | 76 | 30 | 152 | 50 | 75 | 196 | 1 | 10 | 71 | 58 | 62 | 1 | 16 | 63 | 207 | 30 | 90 | 60 | 100 |
| 6 | 5 | 86C.TIF | 36 | 5 | 131 | 66 | 70 | 222 | 1 | 10 | 41 | 33 | 57 | 1 | 28 | 59 | 151 | 10 | 10 | 10 | 85 |
| 6 | 5 | 87C.TIF | 55 | 4 | 146 | 70 | 75 | 199 | 1 | 50 | 30 | 34 | 66 | 1 | 36 | 69 | 160 | 10 | 10 | 10 | 55 |
| 6 | 5 | 88C.TIF | 58 | 20 | 146 | 72 | 100 | 72 | 1 | 10 | 38 | 45 | 61 | 1 | 31 | 67 | 158 | 20 | 10 | 10 | 70 |
| 6 | 5 | 89C.TIF | 75 | 36 | 125 | 66 | 96 | 78 | 1 | 10 | 48 | 58 | 49 | 1 | 24 | 55 | 147 | 10 | 160 | 40 | 105 |
| 6 | 5 | 90C.TIF | 7 | 100 | 116 | 11 | 57 | 100 | 1 | 10 | 17 | 1 | 55 | 167 | 150 | 55 | 145 | 10 | 10 | 10 | 105 |
| 1 | 5 | 06C.TIF | 28 | 100 | 160 | 77 | 41 | 39 | 1 | 10 | 75 | 5 | 68 | 82 | 28 | 69 | 164 | 10 | 10 | 10 | 70 |
| 1 | 5 | 07C.TIF | 65 | 7 | 132 | 82 | 97 | 76 | 1 | 310 | 104 | 36 | 65 | 16 | 24 | 44 | 174 | 10 | 10 | 10 | −60 |
| 2 | 5 | 15C.TIF | 23 | 9 | 138 | 24 | 46 | 100 | 1 | 10 | 28 | 13 | 64 | 20 | 68 | 64 | 157 | 10 | 10 | 10 | 75 |
| 2 | 5 | 16C.TIF | 104 | 15 | 108 | 46 | 103 | 149 | 1 | 10 | 55 | 81 | 35 | 1 | 23 | 45 | 142 | 50 | 100 | 10 | 85 |

DESCRIPTORS

TO FIG. 26b

FROM FIG. 26a

| CLASS | | | | | | | | | | | | | | | | | | | | |
|---|---|---|---|---|---|---|---|---|---|---|---|---|---|---|---|---|---|---|---|---|
| 2 | 17C.TIF | 72 | 29 | 103 | 32 | 63 | 266 | 1 | 10 | 46 | 57 | 38 | 1 | 25 | 44 | 137 | 10 | 10 | 10 | 100 |
| 4 | 37C.TIF | 182 | 17 | 197 | 51 | 75 | 171 | 1 | 30 | 78 | 51 | 66 | 1 | 69 | 81 | 245 | 90 | 120 | 20 | -20 |
| 4 | 39C.TIF | 208 | 33 | 169 | 66 | 81 | 500 | 1 | 10 | 93 | 92 | 55 | 1 | 46 | 68 | 245 | 110 | 160 | 20 | 5 |
| 4 | 79C.TIF | 207 | 24 | 145 | 81 | 72 | 500 | 1 | 10 | 114 | 122 | 40 | 1 | 10 | 54 | 211 | 110 | 180 | 20 | 15 |
| 4 | 80C.TIF | 435 | 27 | 129 | 73 | 57 | 500 | 1 | 110 | 91 | 125 | 36 | 1 | 10 | 50 | 166 | 340 | 160 | 0 | 60 |
| 4 | 46C.TIF | 79 | 19 | 135 | 38 | 100 | 13 | 1 | 90 | 30 | 34 | 59 | 1 | 33 | 62 | 196 | 10 | 10 | 10 | -105 |
| 3 | 47C.TIF | 160 | 32 | 145 | 41 | 91 | 443 | 1 | 270 | 48 | 76 | 48 | 1 | 19 | 63 | 212 | 10 | 190 | 140 | -75 |
| 4 | 48C.TIF | 206 | 74 | 192 | 42 | 72 | 500 | 1 | 650 | 3 | 17 | 92 | 1 | 154 | 97 | 245 | 20 | 140 | 150 | -260 |
| 5 | 51C.TIF | 341 | 78 | 186 | 62 | 119 | 500 | 1 | 180 | 83 | 103 | 49 | 1 | 104 | 71 | 246 | 70 | 230 | 40 | -215 |
| 5 | 52C.TIF | 526 | 37 | 177 | 75 | 62 | 500 | 1 | 150 | 113 | 110 | 46 | 1 | 109 | 61 | 246 | 160 | 210 | 10 | -65 |
| 5 | 53C.TIF | 576 | 69 | 149 | 81 | 100 | 252 | 1 | 10 | 120 | 114 | 43 | 1 | 29 | 57 | 245 | 690 | 160 | 0 | 45 |
| 4 | 54C.TIF | 92 | 40 | 174 | 55 | 107 | 231 | 1 | 20 | 40 | 45 | 75 | 1 | 23 | 80 | 227 | 10 | 140 | 100 | -95 |
| 4 | 55C.TIF | 57 | 8 | 153 | 58 | 69 | 20 | 1 | 80 | 79 | 24 | 56 | 48 | 26 | 60 | 226 | 10 | 140 | 180 | -40 |
| 4 | 59C.TIF | 38 | 12 | 111 | 19 | 100 | 100 | 1 | 530 | 30 | 18 | 50 | 13 | 31 | 50 | 181 | 10 | 10 | 10 | -105 |
| 7 | 95C.TIF | 74 | 39 | 152 | 55 | 96 | 107 | 1 | 120 | 57 | 53 | 61 | 1 | 23 | 67 | 189 | 10 | 110 | 160 | 100 |
| 7 | 96C.TIF | 45 | 17 | 81 | 52 | 100 | 9 | 1 | 170 | 67 | 25 | 30 | 34 | 17 | 31 | 134 | 10 | 10 | 10 | 90 |
| 7 | 97C.TIF | 61 | 22 | 161 | 26 | 88 | 48 | 1 | 70 | 27 | 37 | 72 | 1 | 33 | 75 | 193 | 10 | 10 | 10 | 90 |
| 7 | 98C.TIF | 90 | 58 | 150 | 64 | 131 | 82 | 1 | 160 | 65 | 67 | 60 | 1 | 16 | 66 | 184 | 50 | 130 | 30 | 125 |
| 7 | 00C.TIF | 65 | 38 | 152 | 50 | 138 | 164 | 1 | 170 | 55 | 54 | 62 | 1 | 20 | 67 | 197 | 30 | 90 | 40 | 105 |

CLASS
1 EMBEDDED PARTICLE
2 EMBEDDED FLAKE
3 S/D EXTRA PATTERN
4 POLY EXTRA PATTERN
5 METAL EXTRA PATTERN
6 SCUMMING
7 GRAINS/HILLOCKS

DESCRIPTOR
1 DEFECT SIZE
2 SOLIDARITY
3 DEFECT COLOR AVERAGE
4 DEFECT COLOR STANDARD DEVIATION
5 EDGE SHARPNESS
6 ECCENTRICITY
7 REGULARITY
8 NUMBERS OF DEFECTS
9 RANGE OF GRAY LEVEL IN HISTOGRAM
10 BIGGEST CONTINUOUS RANGE IN HISTOGRAM

DESCRIPTOR (CONT.)
11 THE START GRAY VALUE OF RANGE
12 THE RATIO OF NOT ZERO TO THE RANGE
13 MAXIMUM FREQUENCY VALUE RELATED TO DEFECT SIZE
14 GRAY VALUE FOR LOW 5% OF THE MAX FREQUENCY
15 THE GRAY VALUE FOR THE MAX FREQUENCY
16 NUMBERS OF PRIMITIVES
17 AVERAGE LENGTH OF PRIMITIVES
18 AVERAGE COLOR OF DEFECT EDGE
19 REFERENCE VALUE

APPARATUS AND METHOD FOR AUTOMATIC KNOWLEGE-BASED OBJECT IDENTIFICATION

CROSS REFERENCE TO RELATED APPLICATIONS

The present application is a continuation of U.S. patent application Ser. No. 08/347,020, filed Nov. 30, 1994, now abandoned.

The U.S. Government may have a paid-up license in this invention and the right in limited circumstances to require the patent owner to license others on reasonable terms as provided for by the terms of contract F33657-91-7205 and/or N00039-91-C-0001 awarded by the U.S. Department of the Navy.

TECHNICAL FIELD OF THE INVENTION

This invention relates to a system and method for automated object identification and/or classification of objects and anomalies in digital images.

RELATED APPLICATIONS

The following patent applications are cross-referenced to one another. These applications have been concurrently filed and are hereby incorporated in this patent application by reference. Hennessey et al., U.S. patent application Ser. No. 08/186,750, filed Jan. 21, 1994, entitled "Apparatus and Method for Image Processing in Symbolic Space" (now U.S. Pat. No. 5,515,453); Hennessey et al., U.S. patent application Ser. No. 08/186,691, filed Jan. 21, 1994 (now says Jan. 24, 1994), entitled "Apparatus and Method for Aligning and Measuring Misregistration" (now U.S. Pat. No. 5,696,835), and Hennessey et al., U.S. patent application Ser. No. 08/185,610, filed Jan. 21, 1994 (now says Jan. 24, 1994), entitled "System and Method for Recognizing Visual Indicia" (now U.S. Pat. No. 5,553,168).

BACKGROUND OF THE INVENTION

With the fast development of computer based vision system technology, the resolution, size and complexity of images becomes much greater and the tasks to which vision system technology are applied. Vision systems are used in widely diverse environments, such as military surveillance and character recognition.

Expert Systems based on sets of rules written by knowledgeable engineers based on interviews and observations of experts have been used to classify objects and anomalies in images. This time consuming method is very slow, inconsistent and difficult to adapt to new circumstances; results vary with the knowledge, training, ability, and fatigue of the operator.

One current technology is neural nets. This is limited by its requirement for a very large number of initial learning examples, usually several thousand, taking many hours to set up. Other technologies are also very complex computationally, requiring processor arrays specific to each equipment configuration at additional cost to meet performance requirements.

Other related technologies, such as convolution and correlation, cannot deal with variations in magnification, contrast, and rotation, which limits their utility to a very small range of constrained environments.

SUMMARY OF THE INVENTION

In accordance with one embodiment of the present invention, an automated object identification and/or classification of objects and anomalies is provided by the steps of capturing a pixel map of an image from a location where there is a possible object(anomaly, and converting the pixel map to primitives. The pixel map and/or the primitives are converted to a set of high level descriptors and based on relevant features such as shape, color, sharpness, etc. These descriptors are compared with sets of descriptors in a knowledge base to classify the object or anomaly and to classify the observed descriptors to the same class as the one in the knowledge base with the most similarity.

DESCRIPTION OF THE DRAWINGS

In the drawings:

FIG. 1 is an overall block diagram of the system according to one embodiment of the present invention;

FIG. 2 is a general logic flow diagram of the operation of the computer of FIG. 1 according to one embodiment of the present invention;

FIG. 3 illustrates lines of primitives;

FIG. 16 illustrates aircraft and truck;

FIG. 19 illustrates outlining an object;

FIGS. 26a and 26b illustrates a set of actual descriptors and classes for semiconductor defects;

DESCRIPTION OF PREFERRED EMBODIMENTS

Referring to FIG. 1, there is illustrated the overall system for object classification according to one preferred embodiment of the present invention for classifying objects and anomalies found in digital images. System 10 includes a digital file 11, a knowledge base 25 and a computer 19. The digital image file 11 provides pixel digital data and/or primitives as discussed in U.S. patent application Ser. No. 08/186,750, filed Jan. 21, 1994. The computer 19 is coupled to a display 27 and to a knowledge base 25. The computer includes, for example, a C program that can detect man-made objects, natural features and anomalies of texture or geometry. The program generates high-level descriptions of an object in an image from pixel data and/or primitives based on its relevant features such as shape, color sharpness, and texture. The computer includes a program for performing the automatic object location and classification of objects that follow the flow chart of FIG. 2.

Figure 12:
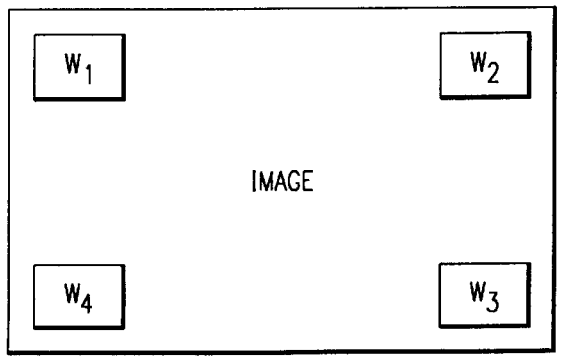
FIG. 12 illustrates alignment for Method 3.
Figure 30:
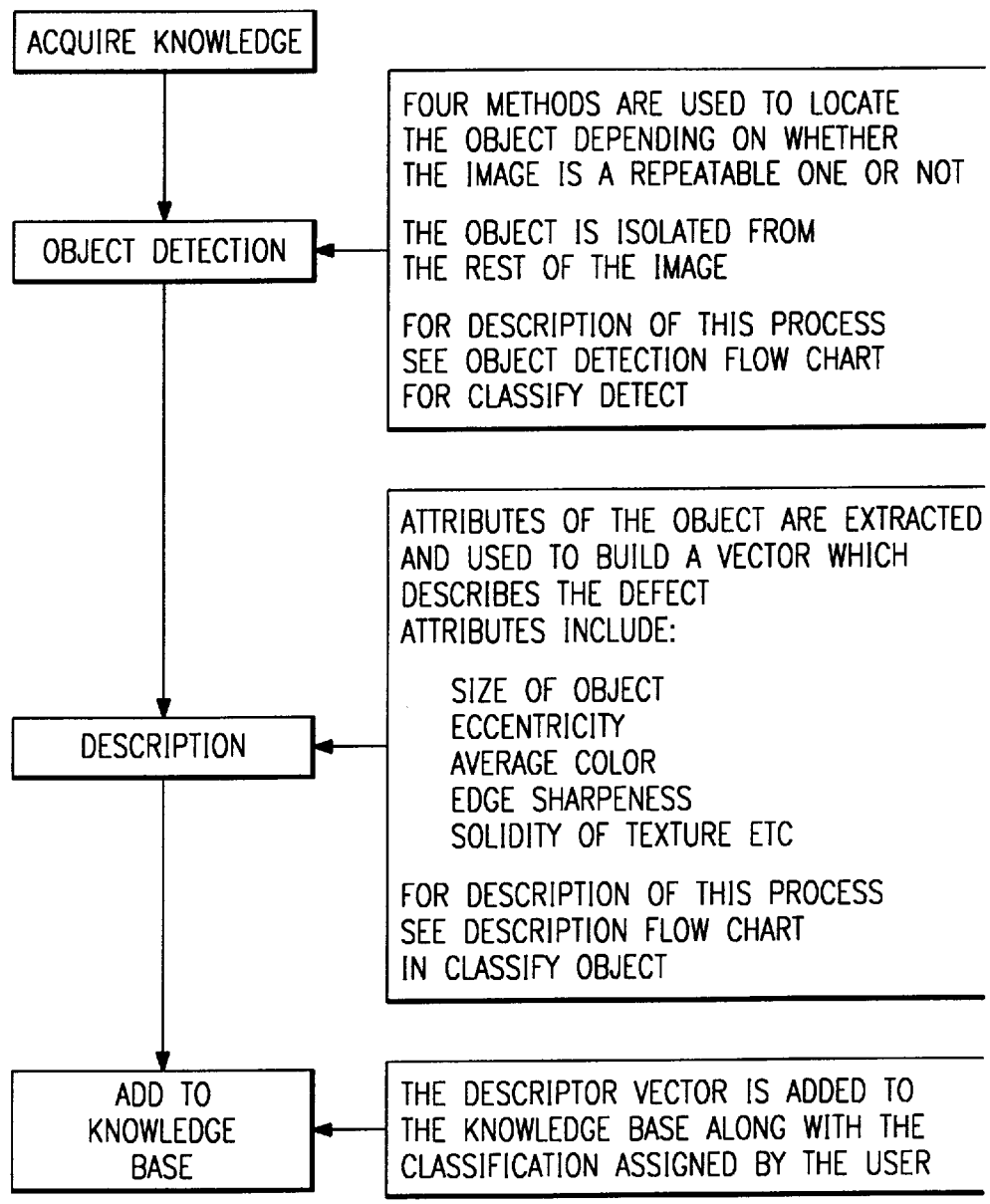
FIG. 30 is a flow chart for acquiring knowledge.

In one exemplary approach, the basic process includes the following:

Step 1. Take a digital file of pixel values (Step 201) from file 11 of an image in which possible objects or anomalies to identify may already have been detected from a low-resolution scan. In order to obtain an accurate appearance of the object or anomaly, it is re-detected at high resolution. This process, according to process 1, includes symbolic decomposition of step 203 and the forming of primitives of step 204 and the steps of the flow chart of FIG. 3. The primitives are formed by the process described in U.S. application Ser. No. 08/186,570 filed Jan. 21, 1994 incorporated herein by reference. An object or anomaly is formed by rotating a circle, or "rolling ball" to join adjacent primitives. As the ball is scanned and texture differences are detected and the primitives of starting points, end points with locations (x, y), length, angle of deviation from previous primitives, left and right texture, and curvatures are stored under an identifier such as a number 102. FIG. 3 illustrates lines 101–119 of primitives. The symbol sp is for the starting point, ep is for ending point, d is for direction or angle of deviation, std is deviation of line from being straight, l is for length, label is a grouping label, texture for both left and right of line, and curvature is location of mid-point of the arc. The primitives are combined to form groups of segments or higher level primitives. This is done by moving the ball, as in FIG. 10 of the above referenced patent application to follow the left and right textures and/or color. The ball can be enlarged to look for new directions. From this is generated segments with width, length, vertices (where primitives are together at an angle) and what is stored is the location and angular deviations of these points. Segments are illustrated in FIG. 12 of the above-referenced application (08/186,750). More details of this are shown and discussed in connection with FIGS. 30 and 31 of the referenced application. Also, sharpness is stored as the number of pixels with the same value as the gradient edge based, on grey scale standard. Step 1 further has the steps in flow chart of FIG. 4 to locate the object. The descriptors of a complete object are stored in step 206 (FIG. 2).

Step 2. From the exact location of the object or anomaly, the set of primitives and segments are analyzed by comparing the object or anomaly to produce a set of high level descriptors 208 from extracted attributes (Step 207) as illustrated in FIG. 2. These high level descriptors are, for example, size, color ranges, sharpness, etc.

Step 3. Compare (step 209) the set of high-level descriptors 208 with the sets of descriptors stored in the knowledge-base 210 to find one which is similar. Classify the descriptor to the same class as the one in the knowledge-base base with the most similarity.

The method discussed above is easily adapted for acquisition of knowledge about the objects or anomalies and stored in knowledge base 210 in FIG. 2. The steps for learning are as follows:

Step 1. Take a digital file of pixel values from a file 11 where there is a possible object or anomaly to identify. In order to obtain an accurate appearance of the object or anomaly, it is re-detected. As stated previously, this may include the symbolic decomposition and the forming of primitives and/or the steps of the flow chart of FIG. 2.

Step 2. From the exact location of the object or anomaly, convert the pixel map format of the object image (and the relationship with the background) and/or primitives to a set of high level descriptors.

Step 3. System asks an expert to type in a name for the identified object or anomaly, then the system stores the set of high level descriptors and the name of the identity of the object or anomaly in a knowledge base.

Figure 4:
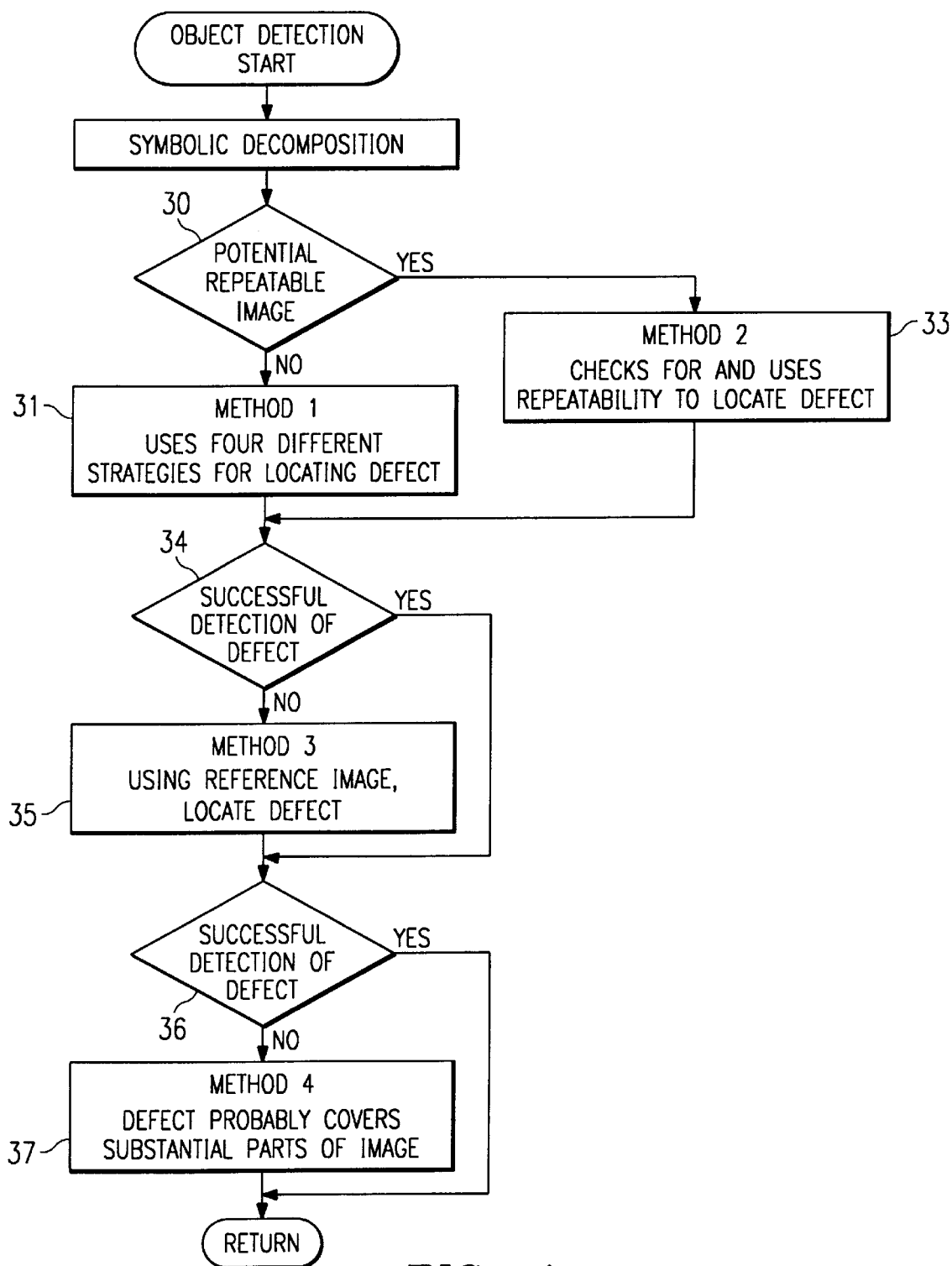
FIG. 4 is a flow chart for locating an object.

Because the current equipment for low resolution scanning may provide only the approximate location of an object or anomaly and no specific characteristics of that object/anomaly, redetection is necessary. Four possible detection techniques are used for the current system. The program steps for locating the object/anomaly are illustrated in FIG. 4. The first two are for non-repeatable and repeatable image patterns. They do not use a reference image. The third technique requires a reference image. The fourth is only used when the first three techniques all fail; it uses logical judgment to assist with correct classification of the object. After the process shown in FIG. 4 reaches the "return" box, the program subroutine or modules returns to other processing steps or program modules.

Detection Method 1 (Step 31 of FIG. 4)

Examples of non-repeatable images are shown in FIG. 4 of application 08/186,750. For this type of image, the symbolic procedure will be run first to decompose the image to some attributed symbolic primitives like LINEs or ARCs (refer to Base Technology, Knowledge Based Image Analysis in Symbolic Space—application Ser. No. 08/186,750 filed Jan. 21, 1994 entitled, "Apparatus and Method for Image Processing in Symbolic Space" incorporated herein by reference).

The approach for detecting objects or anomalies from this type of image is to find the portion where some symbolic primitive formed segments are irregular. Below are some examples illustrating how this method works:

EXAMPLE 1

Sudden Change in Straight Line

Figure 5:
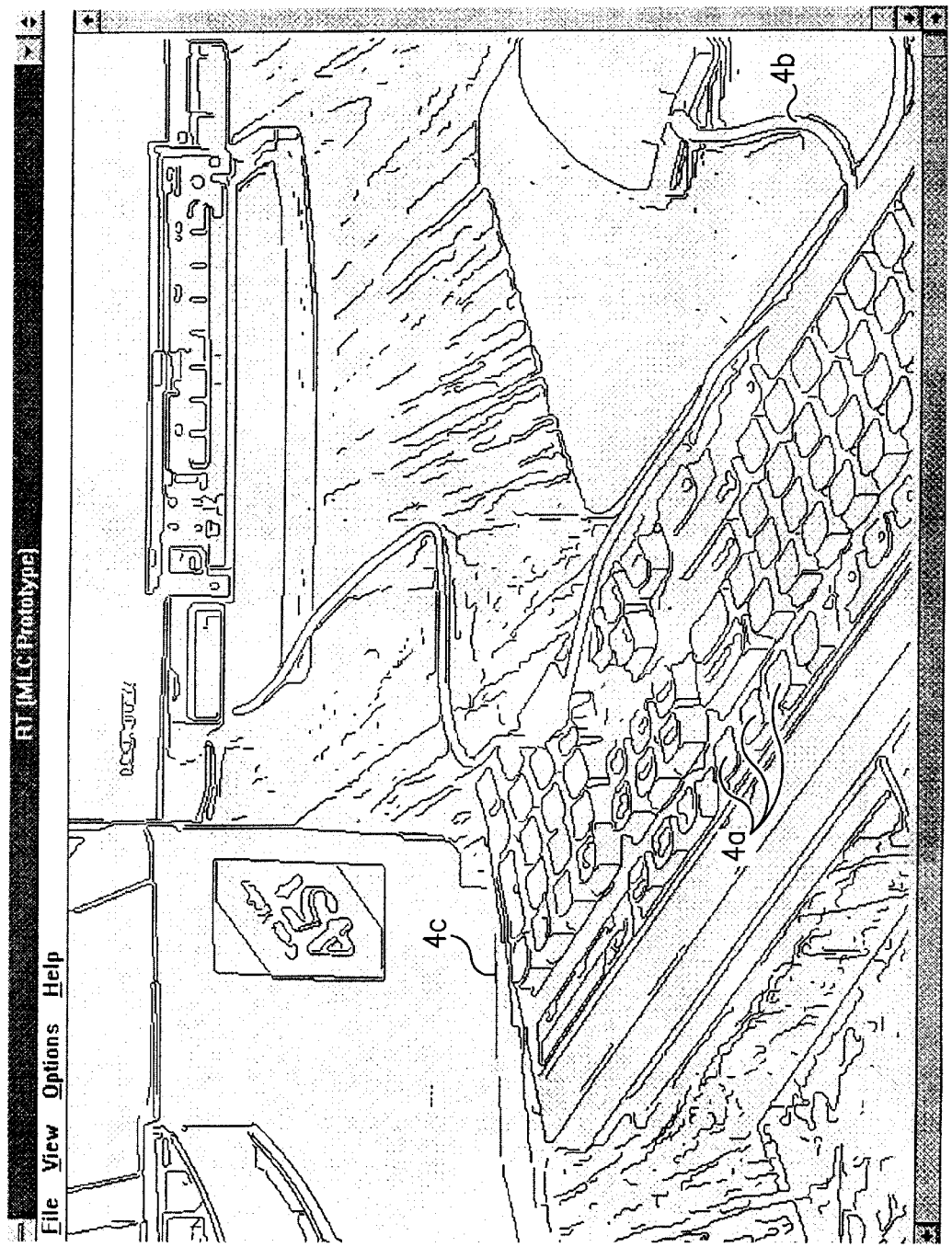
FIG. 5 illustrates a primitive segment drawing of original image in FIG. 6.
Figure 6:
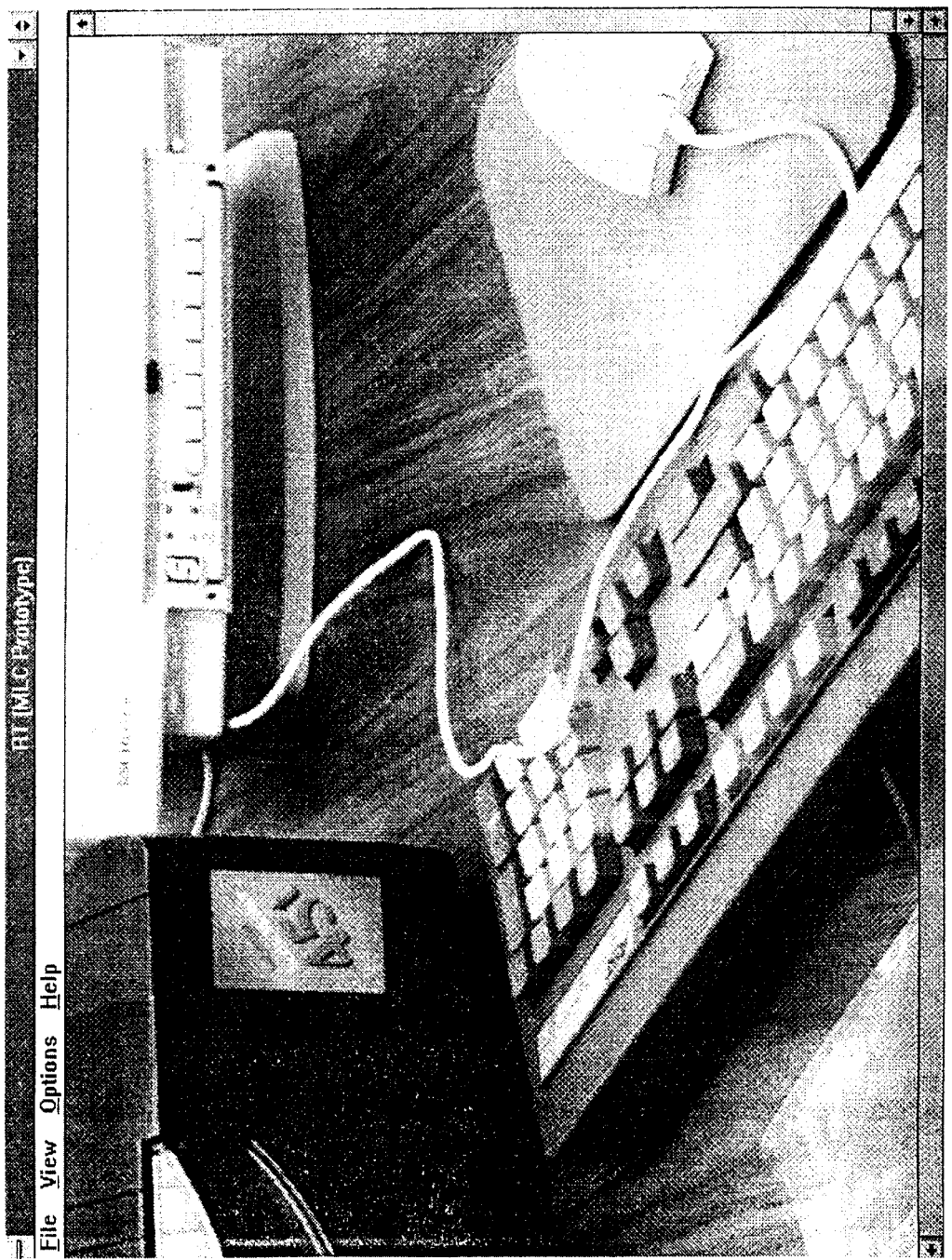
FIG. 6 illustrates an original image in FIG. 5.

In FIG. 5, if a straight line primitive suddenly has an irregular break, it is a possible new object or anomaly 4a. FIG. 6 illustrates the original image before primitives have been derived from the pixel file. The irregular break refers to identifying separate keys 4a in the keyboard.

EXAMPLE 2

Irregular Angle Value

By design, most lines in images of aircraft and man-made objects are parallel, perpendicular, or have an angle of 30°, 45°, etc. If two symbolic primitives meet at an angle other than these regular values, it is likely that an overlap of another object or anomaly 4b exists. See FIG. 5. Compare to FIG. 6, which irregularity 4b indicates a mouse and cable over a pad.

EXAMPLE 3

Edge is Vague

FIG. 5 shows another example of an object or anomaly, in which the edges 4c are unclear. Compare to original in FIG. 6.

Usually for this type of image, all lines are clear and have good edges. If an object is unclear like the one shown in FIG. 6, part of the segment description occurs, the edges will not be clear. By checking symbolic edge sharpness and gray level standard deviation, the object or anomaly 4c can be detected.

Figure 7A:
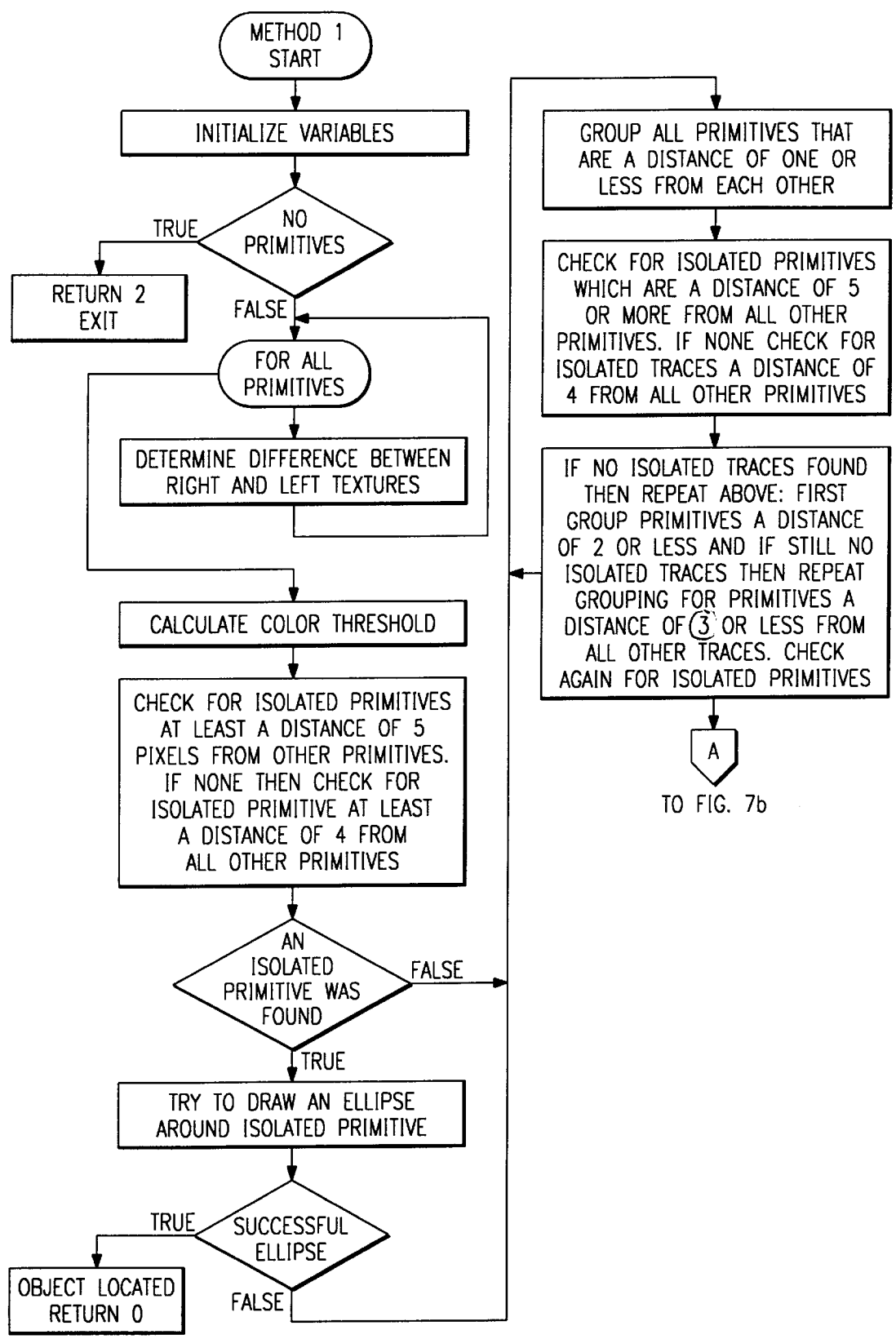
FIGS. 7a and 7b are a flow chart for Method 1 in FIG. 4.
Figure 7B:
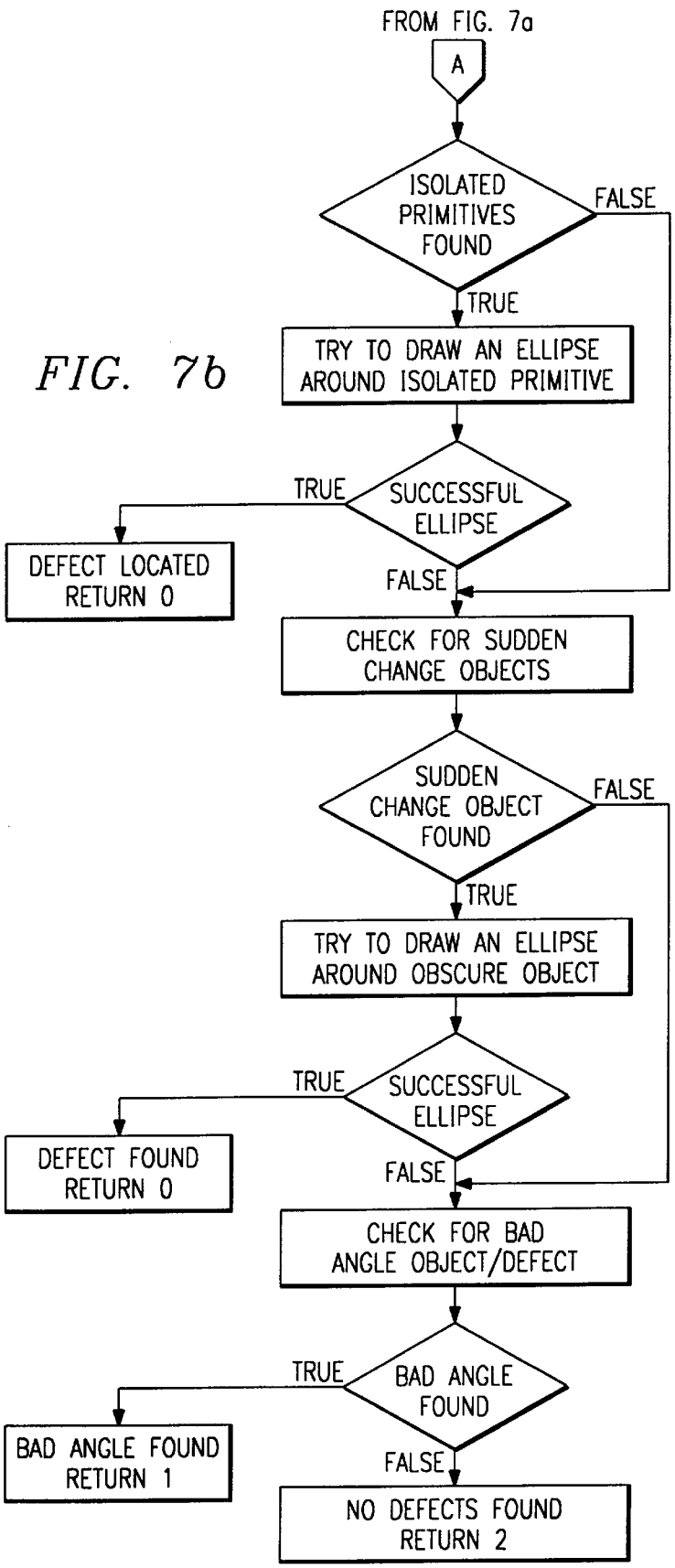

The flow chart of FIG. 7 illustrates the operation of Method 1 to look for the above examples. In FIG. 7, "bad" is used as a synonym for "atypical." The primitives are checked for and return a 1 for irregular, 2 for vague and 3 for a located isolated and a 4 for sudden changes (located something).

If step 30 in FIG. 4 is yes, go to step 33.

Detection Method 2 (Step 33 of FIG. 4)

Repeatable Pattern

Figure 8:
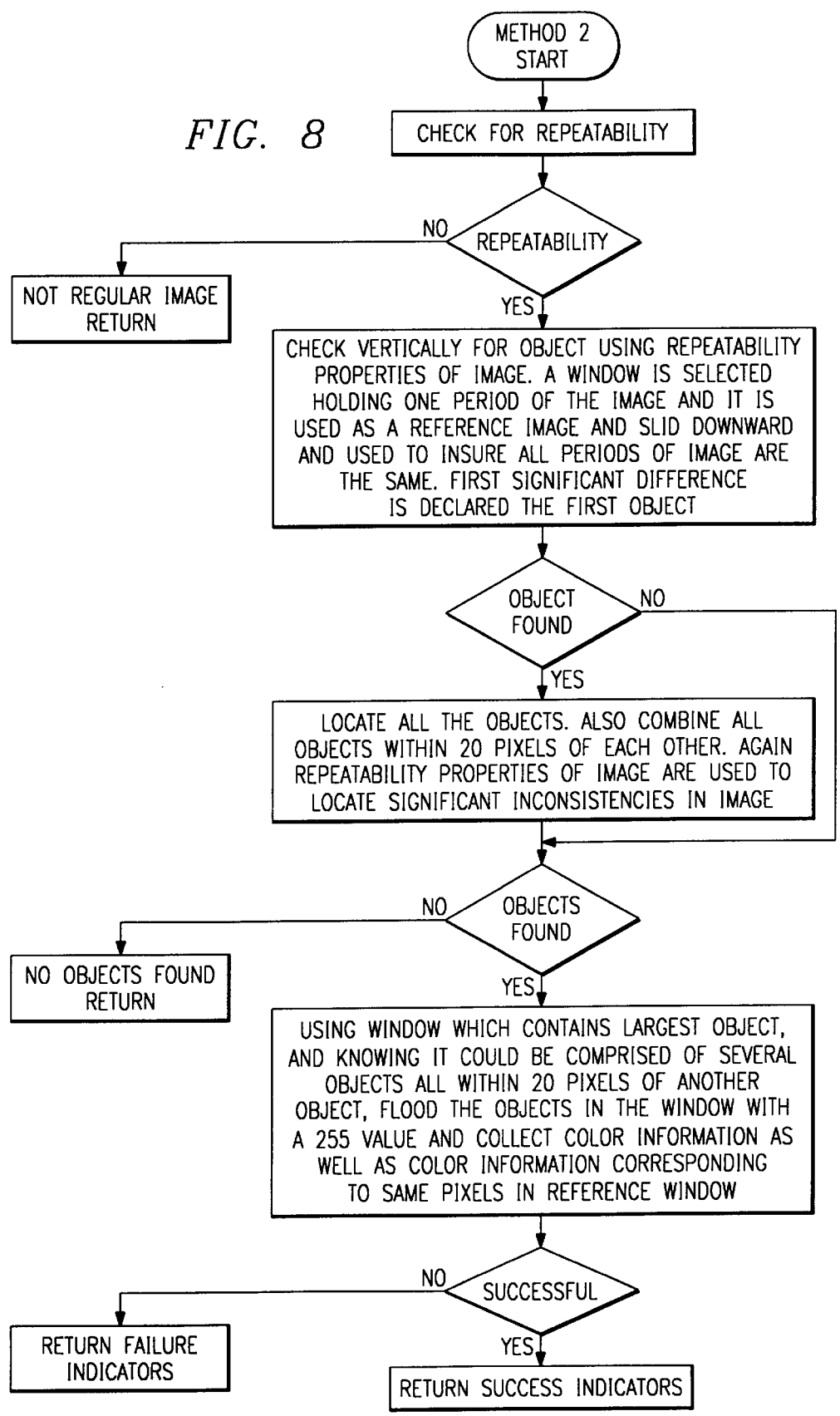
FIG. 8 is a flow chart of Method 2 in FIG. 4.

Many images of man-made objects or textures contain repeatable pattern images, as shown by the keys in FIGS. 5 and 6. In this case, the object or anomaly can be identified without using another reference image. In other words, a good portion of the image containing other similar objects can be used as a reference image. FIG. 8 is a flow chart of Method 2 operation.

Figure 9:
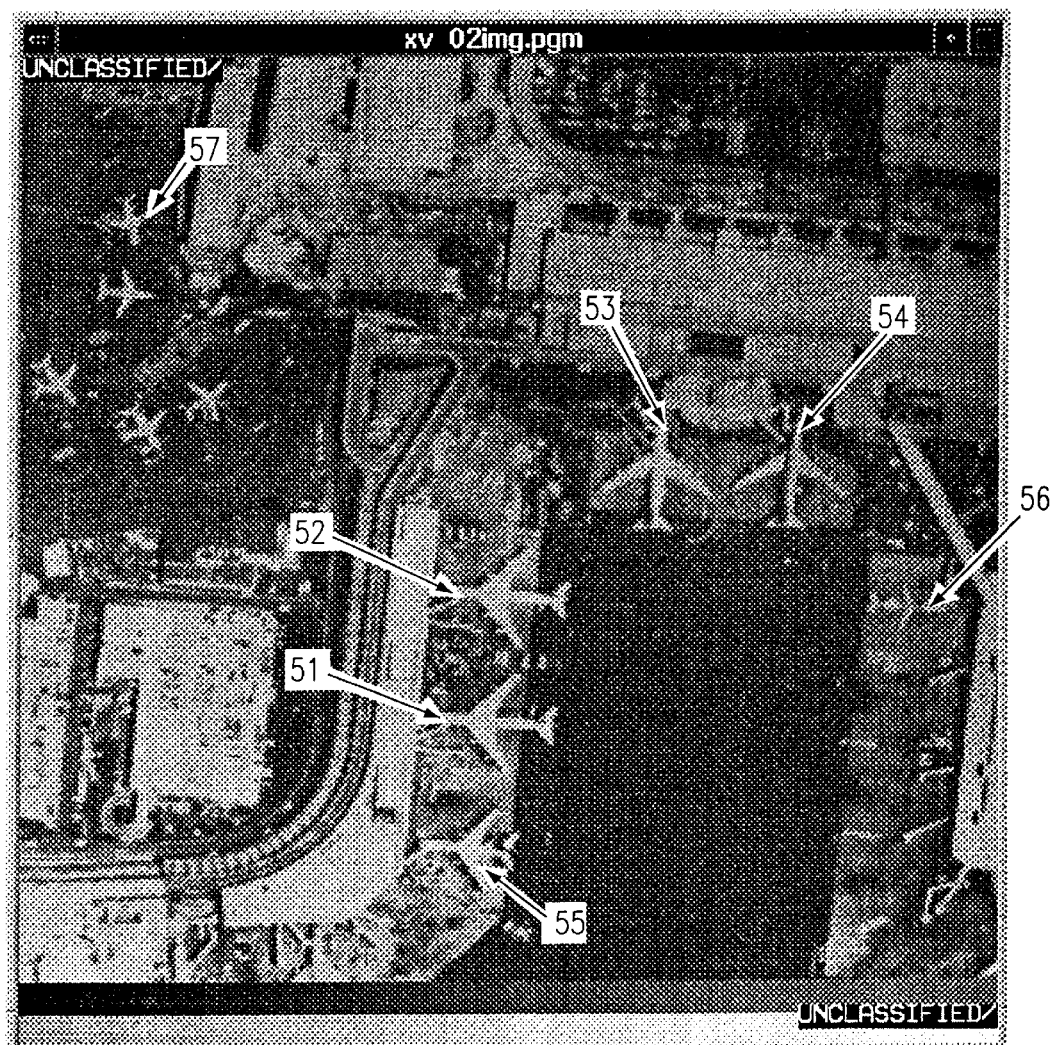
FIG. 9 illustrates multiple aircraft at an airport.

The usual way to detect objects or anomalies in images containing repeatable patterns is to measure the repeatability $(r_x, r_y)$ and/or then define a repeatable area or object in the image, and slide it as a small window throughout the entire image subtracting one block from an adjacent block which is exactly $(r_x, r_y)$ away. When a matching pattern is detected, the object(s) can be located and identified or when a difference is detected an anomaly or new object can be identified. In FIG. 9 there are four like aircraft 51, 52, 53 and 54 and two dissimilar aircraft 55 and 56. Also, five like aircraft 57. The anomaly is represented by the different aircraft 55 and 56. The same may be represented by the different size keys in FIG. 5.

Common techniques to detect repeatability in images include:—Area auto-correlation:

The repeatability $r_x, r_y$ can be obtained by maximizing the area auto-correlation:

$$C(r_x, r_y) \triangleq \sum_m \sum_n U(m, n) U(m - r_y, n - r_x), \forall (r_x, r_y)$$

where U is an image with y- coordinate m and x- coordinate n.

Block Subtraction

The straight forward method to find repeatability is to minimize the following function:

$$e(r_x, r_y) \triangleq U_{ij}(m-n) - u_{ij}(m-r_y)(n-r_x), \forall (r_x, r_y)$$

where $u_{ij}$ is a block in image U.

Usually for $r_x$ and $r_y$ it is only necessary to choose one value and set the other equal to zero. This means one direction of repeatability is enough for detection of an object. After having determined $r_x, r_y$, a small window is passed over the entire image, so that the original image is subtracted block by block to obtain a different image S.

$$S(i,j) = \{u_{ij}(m,n) - u_{ij}(m-r_y)(n-r_x)\}$$

Figure 10:
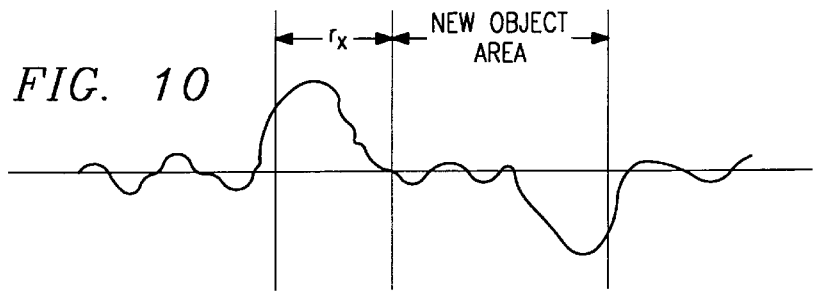
FIG. 10 is a plot for finding new objects in a repeatable pattern.

Along the repeatable direction, the image block whose graph contains zero crossing portion contains a possible object or anomaly. Refer to FIG. 10.

It may be necessary to apply 2-D Gaussian kernel $g(x,y,\sigma)$ with a smoothing factor C to the S before checking for the zero-crossing part:

$$S'(x, y, \sigma) = S(x, y) * g(x, y, \sigma)$$

$$= \int_{-\infty}^{\infty} \int_{-\infty}^{\infty} S(p, q) \frac{1}{\sqrt{2\pi}\sigma} e^{-[(x-p)^2 + (y-q)^2]/2\sigma^2} dp\, dp$$

By thresholding this part of the image that deviates from zero, it is possible to obtain the object bitmap image B.

The above text describes the basic concepts on which the automated object/defect classification (ADC) algorithms are based.

If detection is not successful as determined at decision block 34 of FIG. 4, proceed to step 35. In all cases, references to objects or defects may be used interchangeably.

Detection Method Three (Step 35 of FIG. 4)

Figure 11:
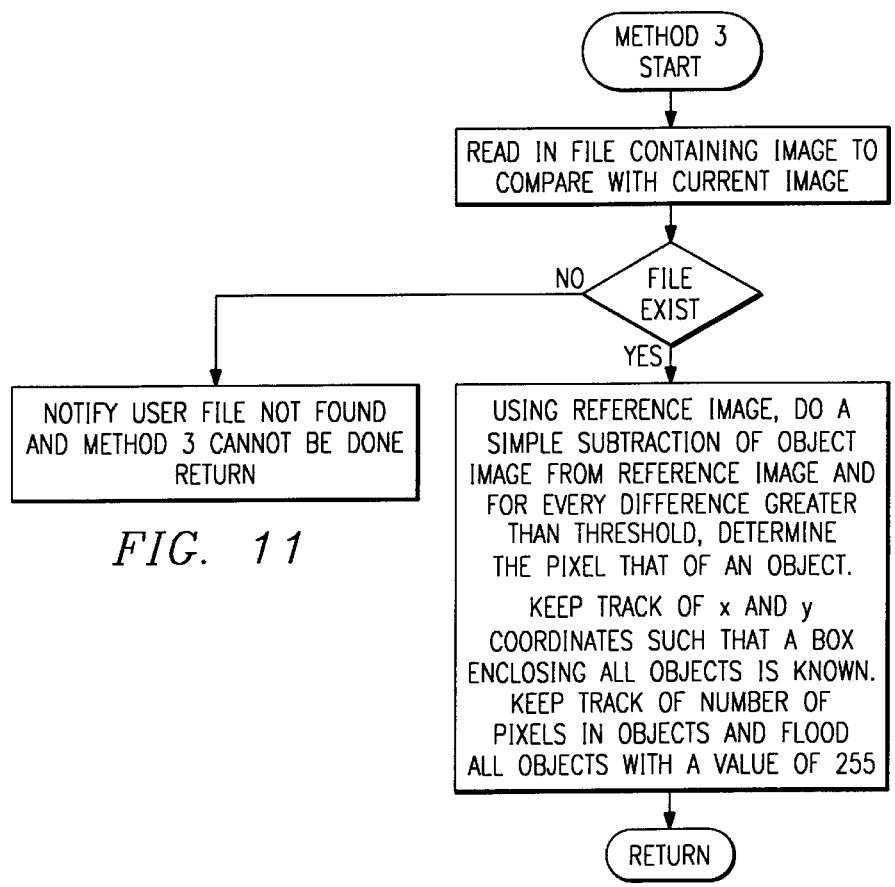
FIG. 11 is a flow chart for Method 3 of FIG. 4.

The standard way to detect objects/anomalies is to use a reference image which can be obtained from the same location at a different time, or a different location where an identical image is expected for example. By straight forward image subtraction, objects/anomalies can be detected. See FIG. 11. See FIG. 12 for alignment using windows.

Denote an image having object(s) as D, the reference image as Y. Before we subtract D from Y, alignment of the two images is usually necessary. In order to speed up this process, four small windows are selected to calculate the displacement $d_x, d_y$.

The cross-correlations $C_w(d_x, d_y)$ attain the maximum value when the displaced position of the object image D coincides with the reference image Y:

$$C_w(d_x, d_y) \triangleq \sum_m \sum_n D(m, n) Y(m - d_y, n - d_x), \forall (d_x, d_y)$$

where w=1, 2, 3, 4 (four windows)

Because an object may occur in a window, only three window values are considered:

$$\overline{d_x} = \frac{1}{3} \sum d_{x_w}, \quad w \neq w_m$$

$$\overline{d_y} = \frac{1}{3} \sum d_{y_w}, \quad w \neq w_m$$

where $w_m = w|C_w$ is the smallest among the four windows. The object bitmap image can then be obtained:

$$B(m, n) = 1, \quad D(m, n) - Y(m - \overline{d_y}, n - \overline{d_x}) > T$$

$$0, \quad \text{otherwise}$$

where T is a threshold, which most of the time should be dynamically decided.

Figure 13A:
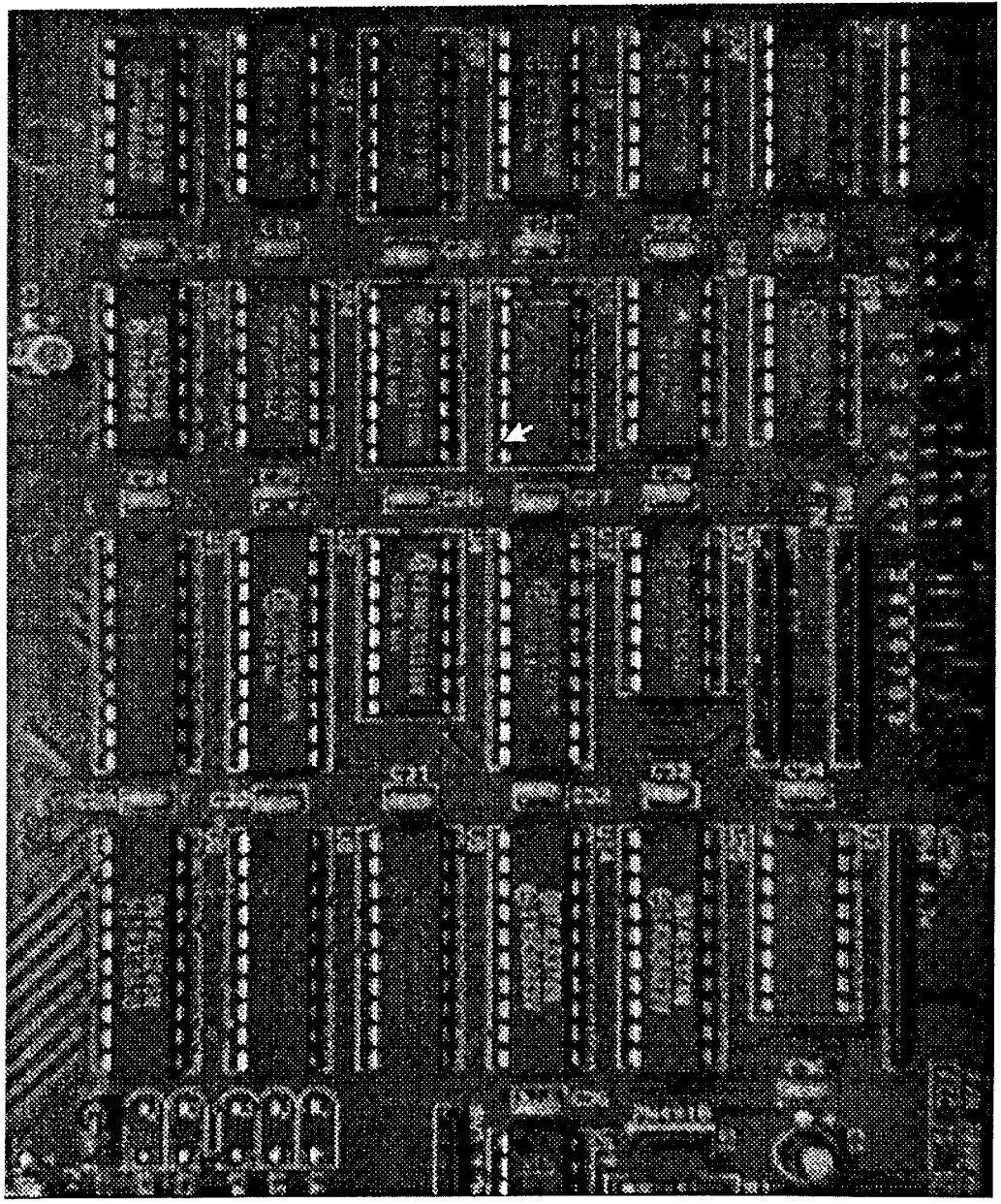
FIG. 13a illustrates a printed circuit board for reference image.
Figure 13B:
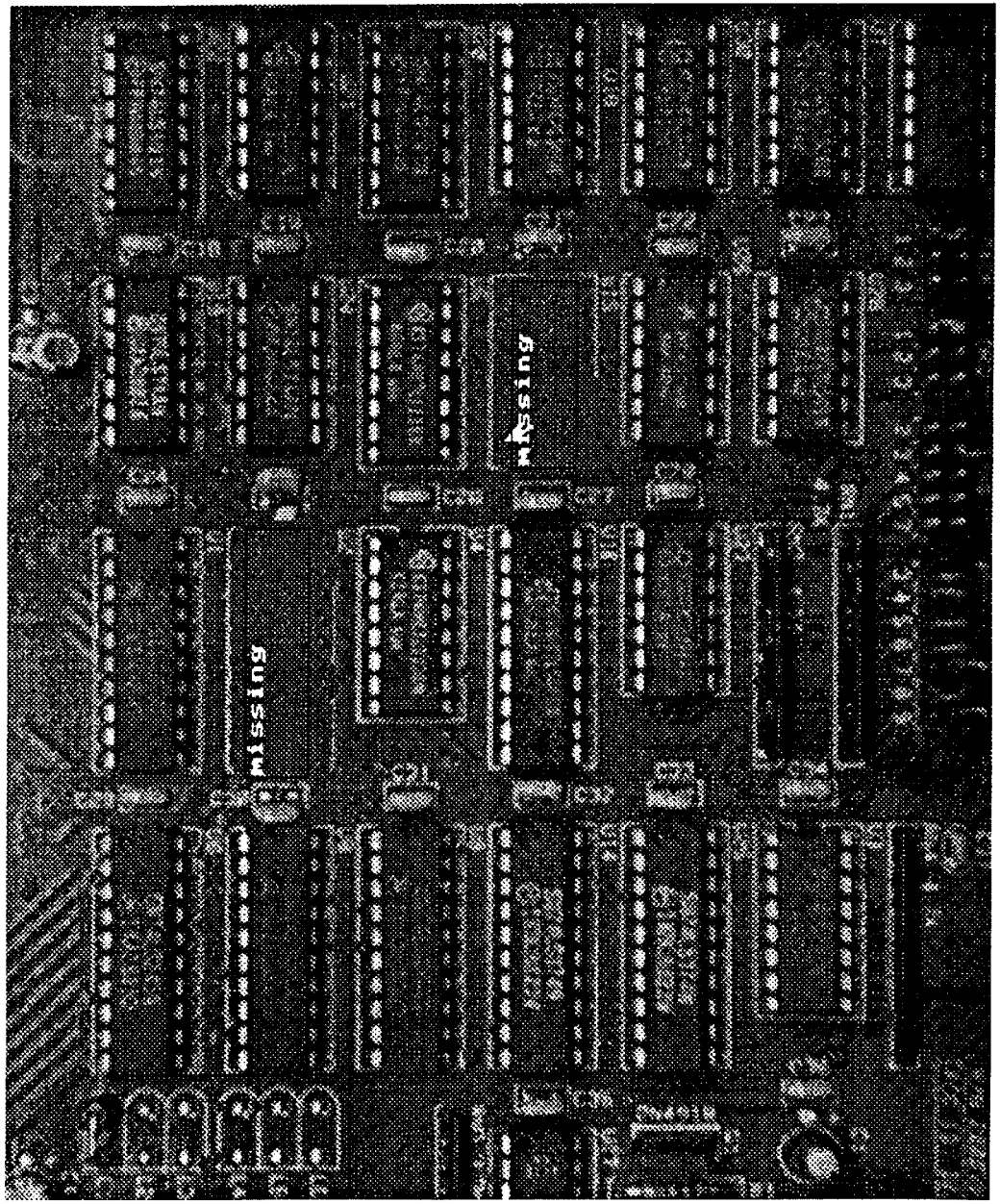
FIG. 13b illustrates missing chips.

An example of using a reference image is shown in FIGS. 13a and 13b, where 13a is the reference image of a printed circuit board with all chips mounted thereon used as a reference, and FIG. 13b illustrates detecting two missing chips on the printed circuit board.

Another approach to detecting objects using a reference image is to do object alignment; then within the area defined identification of the object can be made.

Object Alignment

Figure 14:
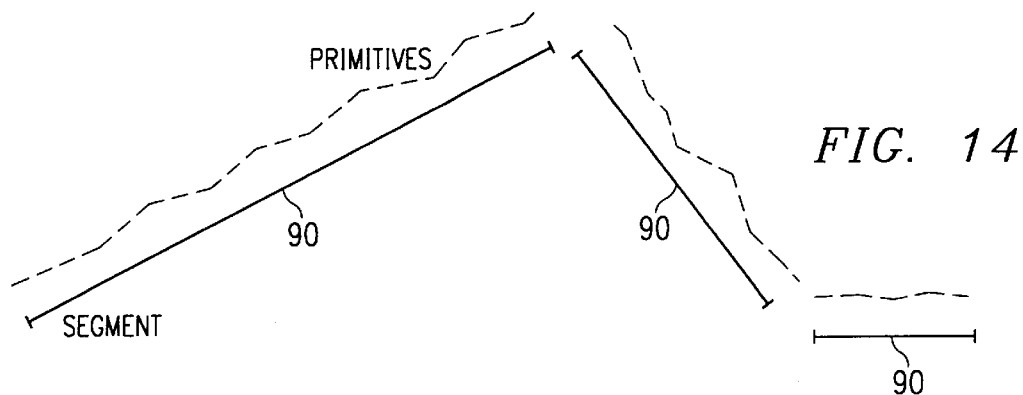
FIG. 14 illustrates extending primitives to lines that extend ⅕ of the image.

1. Extend primitives to several (at least 2) lines 90 that extend at least ⅓ of the image. See FIG. 14.

Figure 15:
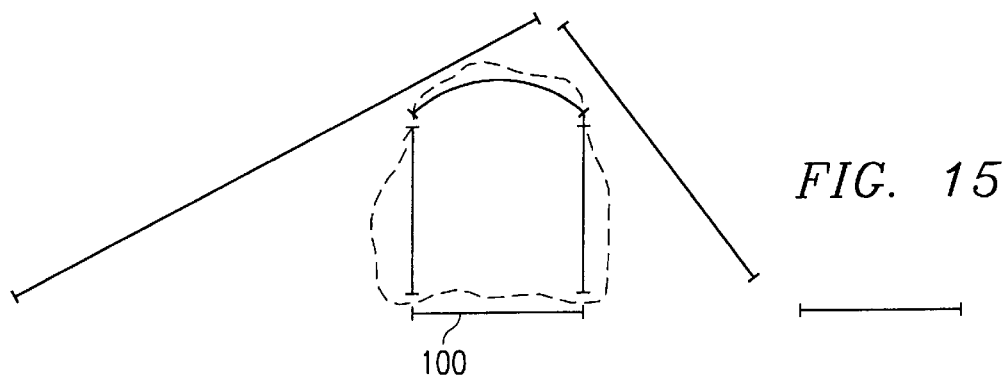
FIG. 15 illustrates shorter lines within longer lines.

2. Locate at least three shorter lines 100 in FIG. 15 within the region defined by the longer lines 90.

3. Search the image file for primitives that can also be extended as in (1) and (2) above.

4. Search for primitives that match those in (2).

5. Enlarge the smaller set of lines to match those in (1), then enlarge the image according to this magnification coefficient.

6. Calculate the offset for each extended line and rotate the entire image.

Detection Method Four (Step 37 of FIG. 4)

Figure 17:
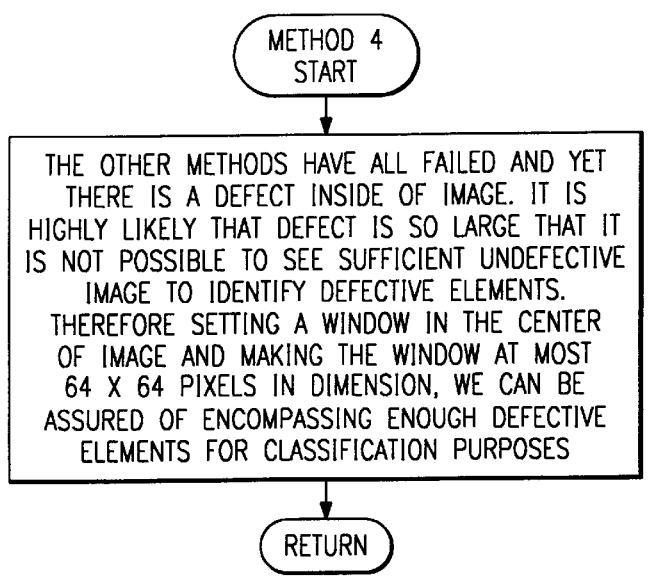
FIG. 17 is a flow chart of method 4 of FIG. 4.

In circumstances in which it is not possible to use a reference image, when the technique described in Detection Method 2 is used to detect an object/anomaly in an image as shown in FIGS. 8 and 9, the function for detecting repeatability probably will fail, leaving up to half of the attributes not calculated. However this does not mean that the object or anomaly cannot be classified. Although almost half of the segments or primitive attributes do not match, some additional information from the detection failure is available. This information, from logical judgment, can provide enough information to classify the object correctly. For example, trucks can be differentiated from aircraft but the differences between types of aircraft may not be sufficient to identify a specific type but the differences between the types of aircraft can be stored and compared to make up a new class. See FIG. 16 with 110 and 111 representing different aircraft and 112 a truck. FIG. 17 is a flow chart for operation of method 4.

Figure 18:
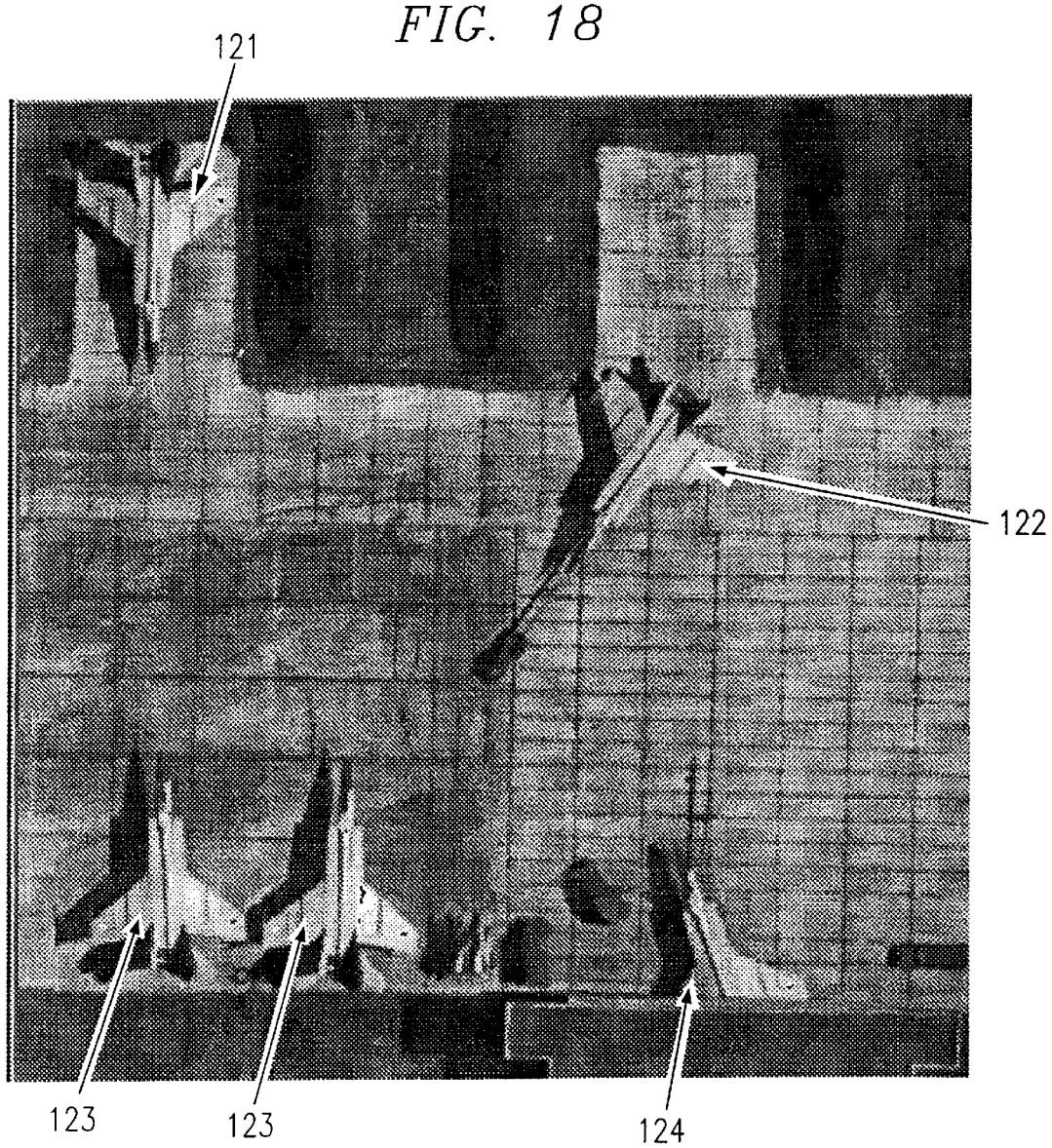
FIG. 18 illustrates similar aircraft.

FIG. 18 shows examples of the technique to identify objects. If all symbolic primitives are massed to form segments, the image may be represented by aircraft 121. If all symbolic primitives are a perfect match, such as the aircraft 123, no pattern anomaly or overlapping object will be identified. A similar conclusion can also be obtained if the technique discussed in Detection Method 2 is applied. If the repeatability detection function fails, the image may be similar to the one shown by object 122. If a match is detected, but the object cannot be located, the image is similar to the one shown in object 124. This information, plus the information provided by high level descriptors, facilitates correct object classification. Object 122 can be found by a preponderance of primitives and segments that match after alignment. Object 124 may have enough matching segments to satisfy a threshold level to identify the object.

The system has located the part of the image in which an object such as 124 appears. Taking the difference between this object 124 and the previously located object 123 produces the difference image S (overlapping part). By thresholding the difference image it is possible to obtain an object bit map B. The bit map is a binary image of the exact location of the object. Bit map B is then converted to a set of primitives and segments with locations within the object bit map.

Generating new high level descriptors the object attributes such as size and shape are now determined in step 207 (FIG. 2). As discussed above, the bit map has been converted to primitives and segments and these have been located to define the object identified as step 206 (FIG. 2).

Figure 20:
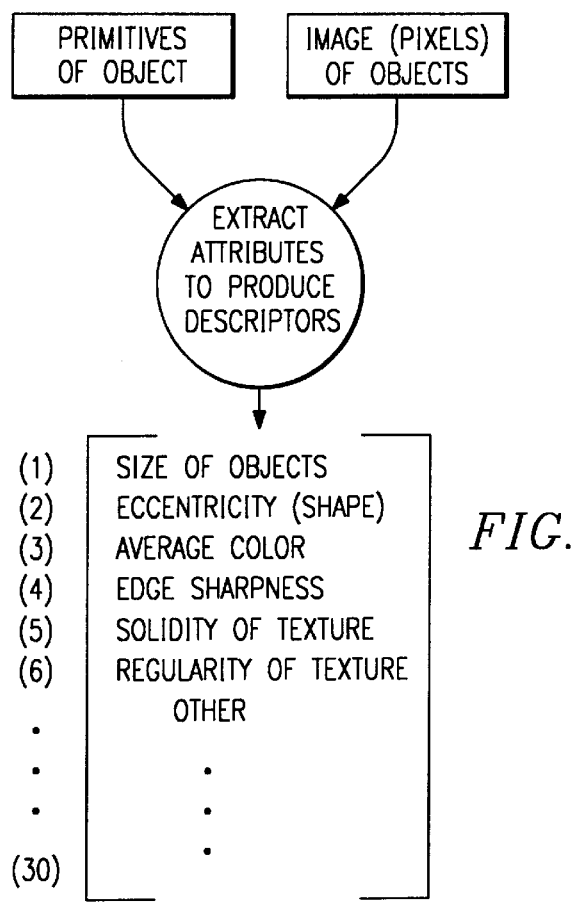
FIG. 20 illustrates extracting attributes.

An exact outline of the object is required for precise conversion of the object image to a set of high-level descriptors. Many methods can be used to accomplish this, one which is to run a circle or "rolling ball" around the edges of the object or anomaly. In FIG. 19, by running a diameter d ball around the object bitmap B to obtain a trace in the manner described in connection with FIG. 10 in patent application of Hennessey et al. entitled "Apparatus and Method for Image Processing in Symbolic Space (see application Ser. No. 08/186,750 filed Jan. 21, 1994). This extracts the primitive comprising objects or anomalies in step 206. The attributes are then extracted in step 207. Referring to FIG. 20, the attributes extracted are from primitives and pixel images. T:

$$T=\{(x_i,y_i)\}, i=0,\ldots,n-1$$

T is closed, that is $(x_n,y_n)=(x_0,y_0)$.

Shape SHP

After obtaining T, a numeric value representing eccentricity is calculated to represent the shape attribute:

$$SHP = \frac{(\mu_{2,0} - \mu_{0,2}) + 4\mu_{1,1}}{SIZE}$$

where

SIZE $$\mu_{p,q} = \sum_{(x,y) \in R} (x-\bar{x})^p (y-\bar{y})^q$$

R is the inside area of T, and SIZE also is an attribute:

SIZE=the size of R

A more complex measure to derive the shape attribute can be used, if necessary.

Color, average $\overline{C}_D$

Also denote the object image (note, not the object bitmap) as D. The color average is:

Edge Sharpness $E_D$ $$\overline{C_D} = \frac{1}{SIZE} \sum_{x,y \in R} D_{x,y}$$

Also we have boundary information, which can define edge sharpness:

$$E_D = \frac{1}{M} \sum_{i,j \in T} O * D_{i,j}$$

where M is the length of trace T, and O is an edge operator.

Other useful attributes are defined as follows:

Solidity of Texture: SOL

Solidity, which represents the solidity of the object texture:

$$SOL = \frac{\sum_{x,y \in R} B_{xy}}{SIZE}$$

B is the object bit map image, the value of the $B_{xy}$ is either 1 or 0.

Regularity of Texture: REG

Figure 21:
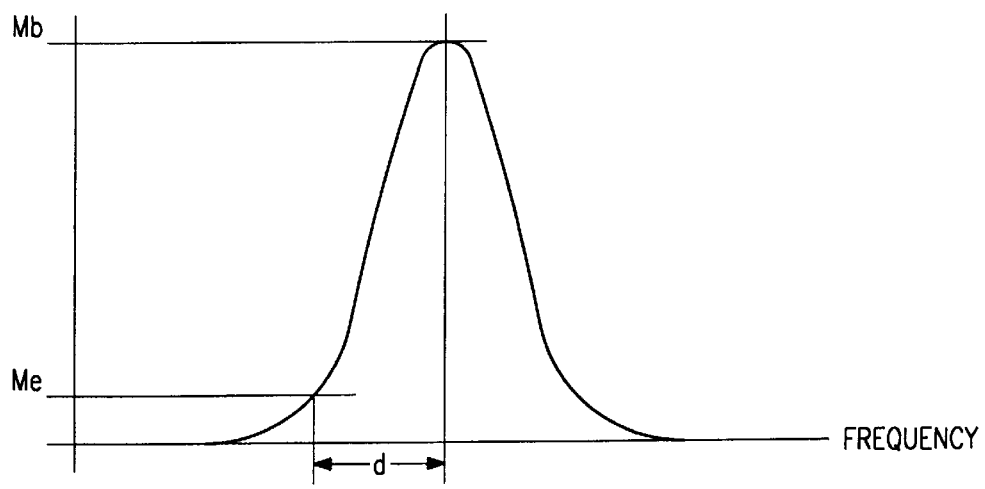
FIG. 21 illustrates determining regularity of texture.

Regularity: Perform DFT or convolution for the interior area R of the object image D to define the regularity of the object portion of the image:

$$REG = \frac{M_h}{M_e}$$

where $M_h$ and $M_e$ are illustrated in FIG. 21.

Statistical Information Derived From Attribute Values: $STD_D$

Color standard deviation of image D:
Histogram of gray level range R of image D. Let $$STD_D = \frac{1}{n}\sum_{x,y \in R}(D_{x,y} - \overline{C_D})^2$$

Figure 22:
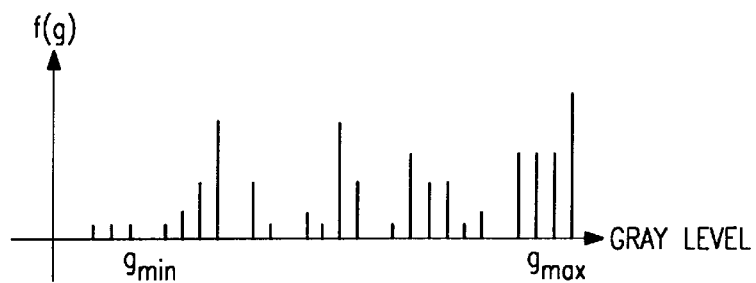
FIG. 22 illustrates a histogram of gray levels in Region R of object image D.
Figure 23:
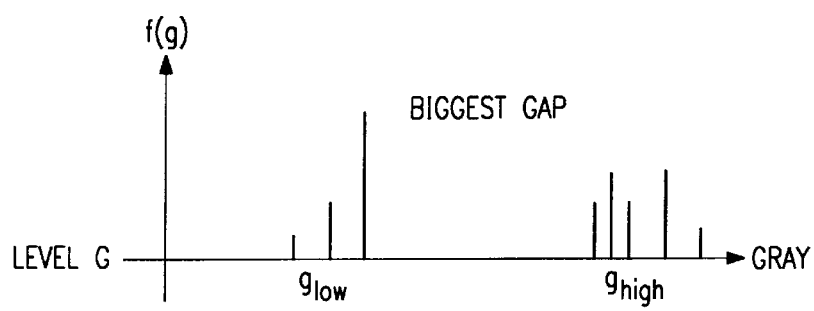
FIG. 23 illustrates more attributes obtained from histogram.

H [g]=frequency of the gray level g
Obtain gray level range G, and gray level gap Gg.
Gray level range:

$$G_r g_{max} - g_{min}$$

where $g_{max}$ and $g_{min}$ have the meaning illustrated in FIG. 22.
Gray level gap:

$$G_g = g_{high} - g_{low}$$

where $g_{high}$ and $g_{low}$ are illustrated in FIG. 23.
Texture in Symbolic Space
When region R is symbolically decomposed (see application Ser. No. 08/186,750 cited above and incorporated herein by reference), the following attributes can be obtained from the generated n symbolic primitives:
Number of primitives $SYMB_n$:
$SYMB_n = n$;
Average length SYMB:

$$SYMB = \frac{1}{n}\sum_{i=1}^{n} PRIMITIVE[i].length$$

Inside edge sharpness SYMB:

$$SYMB = \frac{1}{n}\sum_{i=1}^{n} PRIMITIVE[i].leftcolor - PRIMITIVE[i].rightcolor$$

More information can be obtained from symbolic primitives. Please refer to "Base Technology": (again see application Ser. No. 08/186,750 cited above).
The Relation Information
The color average $\overline{C_s}$ can also be obtained for the difference image S:

$$\overline{C_s} = \frac{1}{SIZE}\sum_{x,y \in R} S_{xy}$$

Symbolic decomposition of region R for good image Y generates a set of symbolic primitives. The percent of match between this set of primitives and the set of primitives generated in the "Texture in Symbolic Space" above gives the transparency measure TRA:

$$TRA = \frac{\text{number primitves matched}}{\text{total number of primitives}}$$

All attributes in a set of descriptors are properly scaled, which means there is a weight associated with each attribute. These weights can be fixed, or can be dynamically changed according to the object class.

Figure 24:
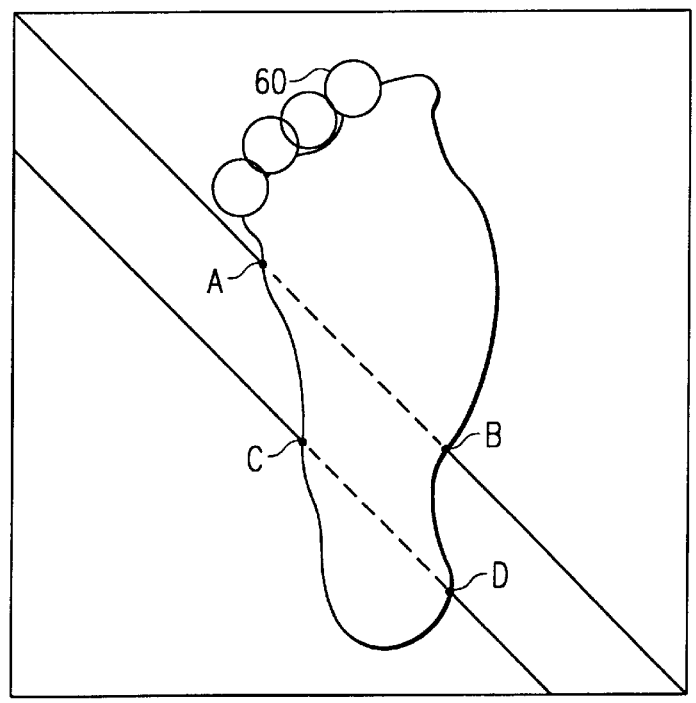
FIG. 24 illustrates a second process to obtain high level descriptors.
Figure 25:
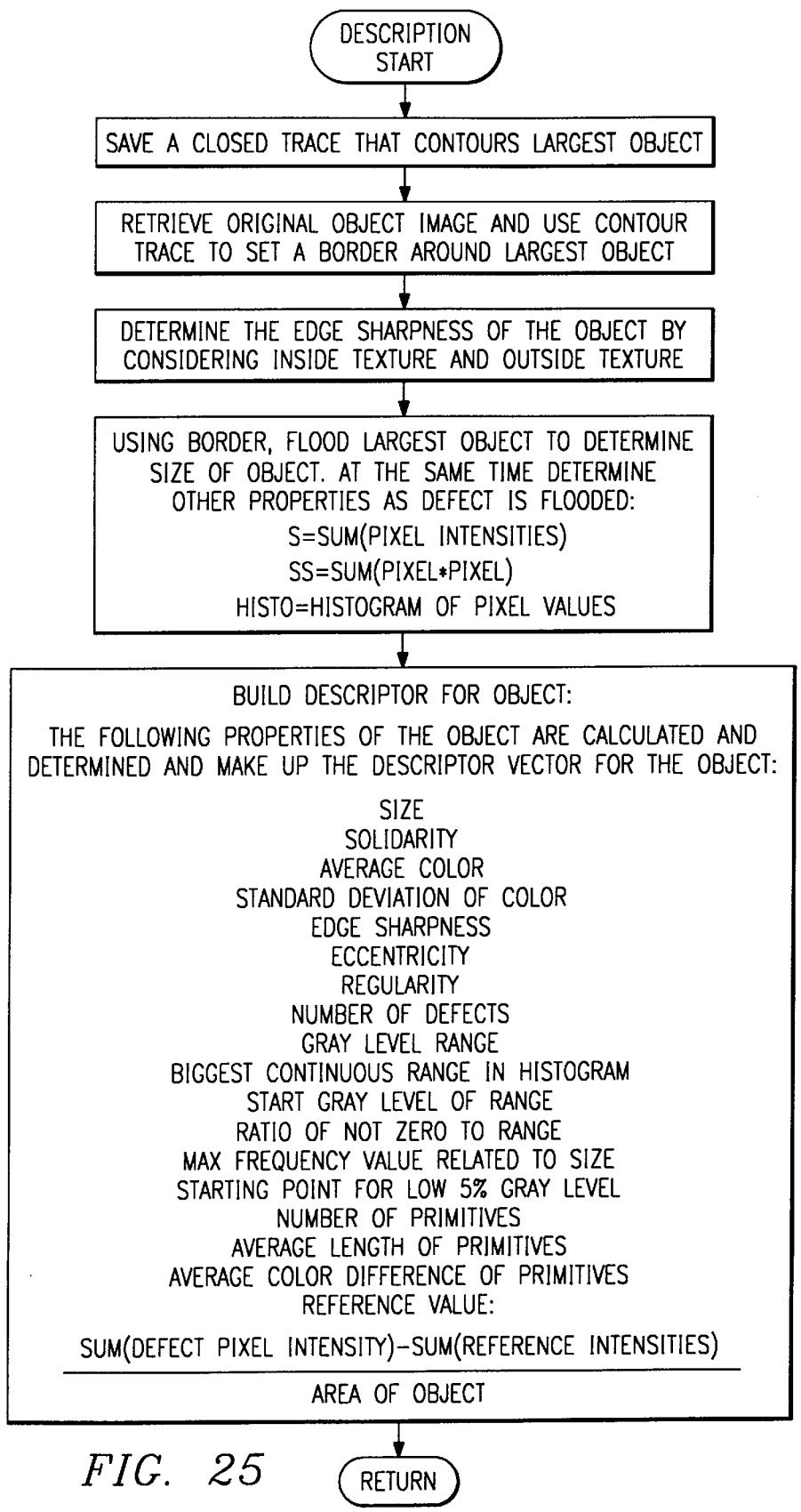
FIG. 25 is a tracing flow chart for defects.

In accordance with a second process (Process 2), the pixel map is traced along texture and/or color changes as shown in FIG. 24 to generate high level descriptors of an object or defect without generation of primitives or segments of primitives of the entire bit map. The second process is represented in FIG. 2 by path 202. The bit map is scanned and where the scan crosses the texture change at point A, the location is noted and so is the texture. The scanning locates the texture change again at point B. The second point of the object is determined. A second scan locates points C and D. According to this process, the outline of the object is traced and identified by starting at one point A, for example, and with a rotating ball as represented by circle 60 and discussed in base technology cited above the borders are traced. When a texture interface is missing the ball size is enlarged and rotated to find the boundary. What is stored is the rotating point and rotation of the ball as well as the texture inside the ball and to the right of the ball. If there is a change in texture within the outlined object a small set of primitives is generated for the inside of the object. An object may also be located within the area. A flow chart for the operation to determine if pieces belong or not to a common object is determined by the flow chart of FIG. 7. If an ellipse can be drawn around the object or anomaly, it is a new object or anomaly. The same technique can be used to detect repeatable objects. In the flow chart substitute "trace" for "primitives." For tracing defects see flow chart of FIG. 25. These high level descriptors are derived directly from traces of the size, color, sharpness and texture for each object without going through the formation of primitives and segments of the entire bit map.

CLASSIFICATION (Step 209 of FIG. 2)
Similarity Function:
The following similarity function is used to measure the similarity between two high-level descriptors:

$$SIMILAR(O_i, O_j) \triangleq \frac{O_i \cdot O_j}{O_i \cdot O_i + O_j \cdot O_j - O_i \cdot O_j}$$

here "." means dot product:

$$O_i \cdot O_j = O_i^T \cdot O_j = |O_i||O_j|\cos(O_i, O_j)$$

Knowledge Base (Step 210)
The knowledge base 210 (K) is a collection of n correctly classified examples each of whose classifications is the first of a set of descriptors $K_{j,i}$. This collection is stored in a matrix format where $K_j$ is a set of high level descriptors for one example j. Each descriptor $(k_{j,i})$ in the set $K_j$ has been derived from operation of the algorithms and methods discussed above on the primitives that represent the object in the image. The classification of the object $k_{j,i}$ is the first descriptor in the set $k_j$.

TABLE 1

| An example of object knowledge-base. | |
|---|---|
| Example descriptor set $K_{1,i}$ (i = 1 . . . 30) | $k_{1,1}$ = 8 (object class 8) |
| Example descriptor set $K_{2,i}$ | $k_{2,1}$ = 5 (object class 5) |
| Example descriptor set $K_{3,i}$ | $k_{3,1}$ = 3 (object class 3) |
| Example descriptor set $K_{4,i}$ | $k_{4,1}$ = 5 (object class 5) |
| . | . |
| . | . |
| . | . |
| Example descriptor set $K_{j-1,i}$ | $K_{j-1,1}$ = 11 (object class 11) |
| Example descriptor set $K_{j,i}$ | $K_{j-1}$ = 3 (object class 3) |

Table 1a shows a simple object knowledge-base. $k_{2,1}$=5 means that this object or anomaly belongs to class category 5.

One set of actual descriptors applicable to semiconductor defects appears in FIGS. 26a of 26b.

Classification (Step 209 of FIG. 2)

When an image of an object is converted into a set of high-level descriptors for an object O, the system compares the values of the high-level descriptors in this instance to all instances of sets of descriptors stored in the knowledge-base to determine which set is most similar to this set of descriptors. If the similarity level is high enough, the system copies the first descriptor, which is the class of object, to the first descriptor of the captured image of the object as the class associated with the most similar set of descriptors in the knowledge-base. That is, the system classifies the captured image of the object represented by the set of high-level descriptors O in order to determine its membership in class category $K_{j,l}$.

$$O_1 \epsilon k_{j,1} | \max \text{ SIMILAR}(O, K_j) \text{ where } O_1 \epsilon O$$

The above classification technique depends on a collection of n correctly classified examples. Because there is no way that the underlying statistics of all possible objects or anomalies can be known, no optimal classification procedure exists. Surprisingly, it has been proved that the simple technique used here has a probability of error which is less than twice the probability of error of the optimal decision rule.

Figure 27:
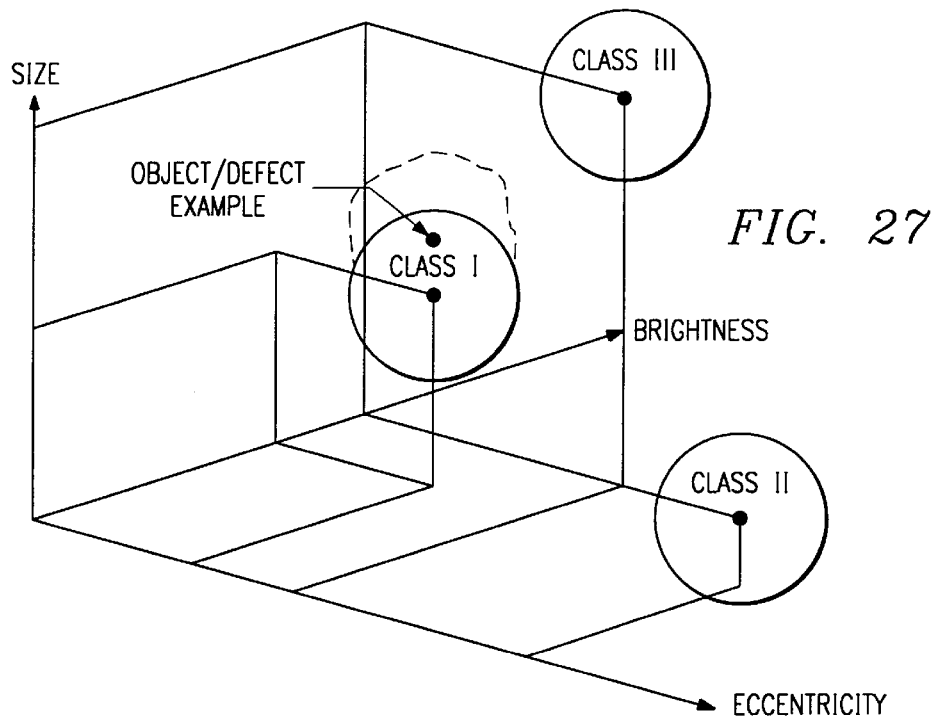
FIG. 27 illustrates classification with three descriptors.

FIG. 27 illustrates by a 3-dimensional model classification using the three descriptors of size, brightness and eccentricity. The objects fall within the globular area about the optimum points for three classes (Class I–III). The classes are center points for the values of size, brightness and eccentricity. The object falls within Class I. The shape of the globe representing data of individual members of the class can be changed dynamically if new knowledge is acquired. For example, when the new object is added in the knowledge base as a member of class I, the individual globe shape adds the dashed line area.

Figure 29:
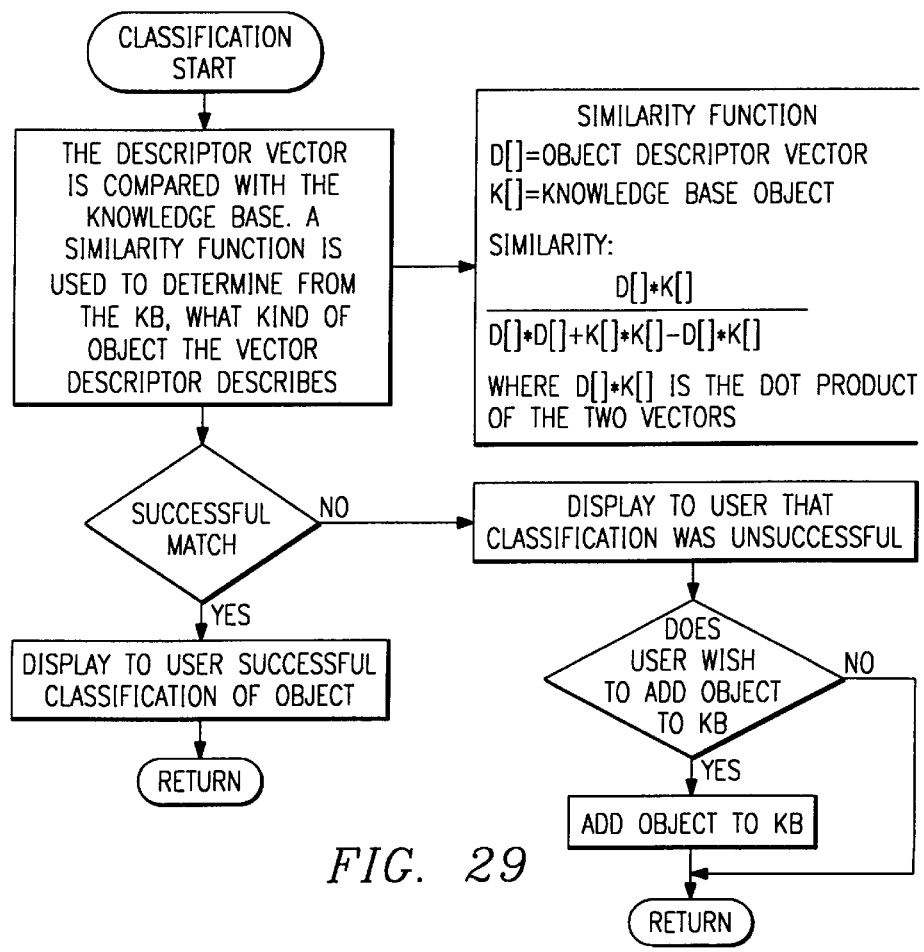
FIG. 29 is a flow chart for classification operation.
Figure 28:
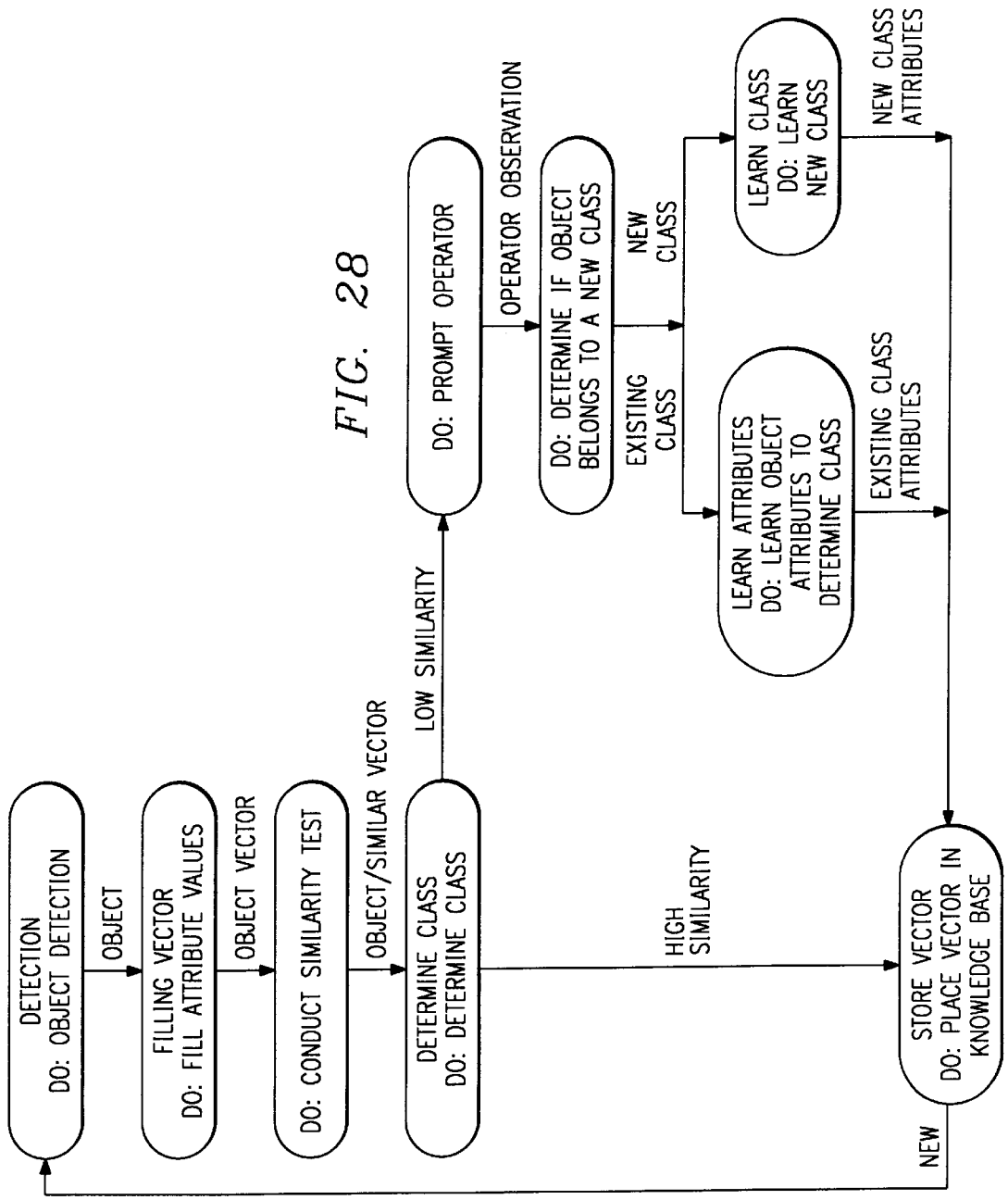
FIG. 28 is a flow chart of the dynamic model of the object knowledge.

This represents "learn attributes" in the flow chart of FIG. 28. Thus by dynamic models, class I becomes an enhanced class. A whole new class can also be learned if a new class is determined. The process of knowledge accumulation requires only a name from an expert; this is known as "supervised learning." An alternate version of the system can automatically group instances and assign them a label, which is known as "unsupervised learning." A flow chart for classification is illustrated in FIG. 29. PROTOTYPE SOFTWARE Create an Object/Anomaly Table Before creating a knowledge-base, create a table to hold an object/anomaly name and corresponding class number. The purpose for this is to avoid allocation of different object/anomaly name for the same class of object/anomaly. For example, if a user first time typed "Small Particle," and the second time typed "Particle Small," it would cause unnecessary problems for the computer, or as would "TC2" and "T2C" as names of aircraft. To avoid this, first we create a table which contains a set of possible objects or anomalies and their names as follows.

TABLE 2

Classification Knowledge-base for Anomaly and for Objects

| Class $K_{j-1}$ | Anomaly | Object |
|---|---|---|
| 1 | Large Particle | F-16 |
| 2 | Small Particle | MIG |
| 3 | Film Residue | A-4 |
| 4 | Contamination | T2C |
| 5 | Missing Pattern | F-18 |
| 6 | Extra Pattern | C-130 |
| 7 | Corrosion | F-3A |
| 8 | Scratch | F-15 |
| 9 | Previous Layer | F-14 |
| 10 | Discoloration | A-10 |
| 11 | Others | Tank, Truck, Tanker, Car |

Now in the learning stage, instead of typing the object/anomaly name, the user types the object class number. The object/anomaly class number for more types of objects can be appended to the table as needed. This table is stored in an ASCII file that can be edited by any means.

Creating a Small Knowledge Base

Alternatively, the system prompts the operator with the number of the next unallocated class when a new class is identified.

The automatic object or anomaly identification system needs a knowledge-base in order to classify a certain set of detected object or anomalies in an image population. In the beginning, the knowledge-base is empty. A small knowledge-base must be created or provided by the user before object or anomaly classification can be started. This standard set of object or anomaly images would be selected for object or anomalies that occur often and are clear, unequivocal members of a specific type of object or anomaly. At this stage, the small knowledge-base setup depends on the user's experience. See FIG. 30 for flow chart.

The following example shows how to create a knowledge-base and to start classifying objects or anomalies. Before creating the knowledge-base, setup text file object.dic is an object code and object name table (See Table 2).

Figure 31:
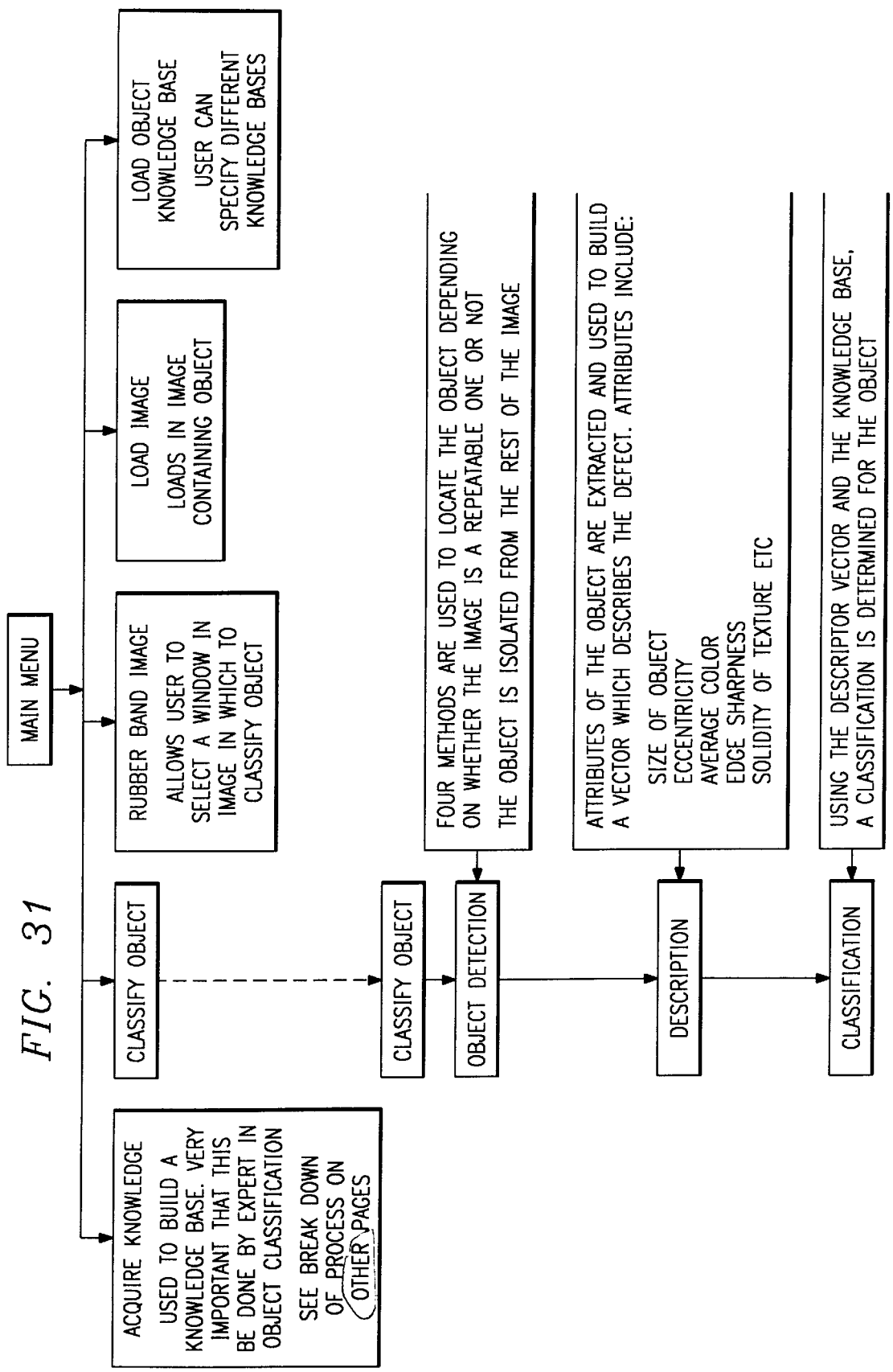
FIG. 31 illustrates a menu for a classification system.

The automatic classification program is run, producing the main menu of the system as represented by FIG. 31.

One selects "knowledge" and types in the characters of the knowledge-base file to identify the knowledge base to be loaded.

At this point, the system has named the knowledge-base. One selects "Load" in the main menu and types in the characters for the image name file.

After "Learn" is selected in the main menu to learn objects or anomalies, a sub-window appears asking for the class number because at this time, the knowledge-base is empty.

Once the class number is entered, the high-level descriptors for the object A4 (for example) is stored in the knowledge-base. Continue to enter names of files containing example object or anomaly images and their classifications into the knowledge-base; the system stores the high-level descriptors for each example object or anomaly after it processes each image.

In the beginning stage, the Classification Result sub-window often displays two types of messages:

1. Enter class number of a new object or anomaly.
2. Name close enough to an existing record in knowledge-base (KB). When this occurs, the current record is terminated. To learn the object or anomaly, the current record needs to be put into the knowledge-base by selecting "Cancel"; the updated knowledge-base sub-window will then appear.

Then type in class number and select "Ok". The current set of high-level object/anomaly descriptors is put into the knowledge base with the object/anomaly class name that is entered.

Classify the Object

After learning a certain number of object/anomaly images, the automatic classification system can start to work. For example, load image 0048, select "Classify," and the classification result will appear as an object 44.

Automatic object/anomaly classification may be put in one of several debug modes to allow operators or software engineers to see the classification process. This alternative is an important part of the invention because it enables users to control the knowledge acquisition and monitor performance of the classification process.

Editing the Image Knowledge Base

Because of new circumstances or an initial classification error by the operator or system, it may be necessary to change the set of examples used for a class of objects or anomalies in the knowledge base. Reduced images of all the objects or anomalies in the knowledge base for that class are displayed, allowing the operator to select any one to be deleted or added to a different class. Addition of new objects or anomalies is described above.

Once a knowledge base is setup, the automatic classification system can classify objects/anomalies for a certain population, within a certain error rate. Knowledge base errors can be categorized as either errors of commission or errors of omission. Errors of commission occur when the system produces an incorrect classification for a given set of high-level image descriptors; errors of omission exist when the system cannot select a class for a given set of descriptors.

Further developments to organization of the knowledge base to reduce system errors and improve classification capability, narrow the scope of the knowledge base to achieve more accurate results, knowledge consolidation, knowledge validation and organization for knowledge base design and its applications, are discussed below.

An automatic object classification system can be shipped as a product to a user complete with a complex knowledge-base which contains knowledge about many objects/anomalies. Because the initial system knowledge has already been learned, users would be able to skip the initial learning procedure. (This approach is not recommended).

Skipping the initial learning procedure may not suit all users for various reasons. For example, the users may classify objects/anomalies in a specified way such as appearance, (extra pattern, missing pattern); relationship of the image to electrical test results (short, open); or the processes associated with the object (corrosion, armed with missiles, moving), or the users may want to classify objects by appearance (trees, roads, buildings), or by relationship to some event (mortar hit, extension of runway).

By creating a narrowed-scope or localized knowledge-base subset specifically for one device, one level and one process or one operations level, automated classification can be more accurate, quicker and require less memory than use of a complex knowledge-base that includes everything. (This approach is strongly recommended).

Such a small object knowledge-base subset for each device level, process, event or appearance group can be stored with a configuration file for reference, alignment and analysis. This would make it unnecessary to invest in network facilities for access to a large complex data base, thereby avoiding delays caused by network capacity and other problems.

In the current design of the knowledge-base for the automatic classification system, the knowledge is stored in a data base as the record vector according to different classifications of objects or anomalies. Knowledge about each object/anomaly classification is stored in the data base by sets of description vectors or attributes, for each class. Values used for the elements of the description vectors are derived from knowledge about object classification from experienced operators or experts in that domain. Rules associated with the knowledge base specify which elements of the vector are to be used to make the result as accurate as possible.

Specific vector elements are weighted according to their relevance as discriminators for selection of an object or anomaly class. Validation of the knowledge base continues during use of the system as does knowledge base development, whereby the user can add new knowledge (description vectors) into the knowledge base as necessary.

When a set of attributes are used as knowledge, the weights for each value in an attribute are different, and the weights for the same attribute value but for a different class are also different and can be adjusted automatically. One simple method for automatic adjustment of a weight is resampling-based multiple testing: based on the analysis of each p-value for the element of the vector (or attribute values), the smaller the p-value the element has, the greater weight will be used. This allows the system to derive a different set of tolerances. One type of object or anomaly may produce several vectors in the knowledge-base. The system calculates the similarity between the object or anomaly description vector and the record vectors in the knowledge base and determines to which class the object or anomaly belongs; if the system gives a wrong result or the system cannot make a decision about the correct classification (these situations occur often during initial development of the knowledge base), the operator usually provides the object or anomaly example and adds the new knowledge to the knowledge base of the system. In such a case, some of the knowledge base may be redundant or some vectors in the knowledge base can be grouped.

Consolidation of the knowledge base is constrained by the need to retain all the original knowledge. Simplification of the knowledge base can be achieved by deletion of very close vectors or by calculation of a new vector instead of a group of very close vectors for a class, and the new vector has a tolerance that expresses a range of similar values. When the value of an observed vector is close to the new vector in the knowledge-base and the difference between these two is greater than the tolerance value for that vector, then the system will put the new object in the class to which the new vector belongs. The tolerance value of each vector can be changed after each use of knowledge consolidation or assimilation procedures. In general, as the knowledge base grows, similar instances can be replaced by a single rule. For example, when anomalies with the attribute values "tail width =0.5 maters," "tail width=0.46 meters," "tail width= 0.53 meters" are all classified as "T-2 tail width," a rule can be automatically generated: "T2 tail width←tail width (0.46–0.53 meters)." Or when objects with the attribute values "wing-width=5 meters", "wing-width=4.6 meters", and "wing-width–5.3 meters" are all classified as "C-130 wing". A rule can automatically be generated: "C-130 wing-width←(4.6–5.3 meters)."

Knowledge validation is the means of ensuring that the output of the system is correct and that the system meets the user's needs. Once the object or anomaly classification knowledge base has been developed and consolidated, it should contain knowledge similar enough to that of an experienced operator so that when presented with a set of images, the system will be able to reproduce classifications made by the experienced operator.

Many methods are employed in the validation of knowledge-based systems. One is validation by testing, whereby a set of prepared test cases is put through the system and the resulting answers are compared for agreement with those of an expert or a panel of experts who deal with the same test cases. In using this method, there are three issues of concern: definition of the agreement between the system's solution and that of the expert, determination of the number of test cases, and criteria for selection of test cases. Field testing, on the other hand, is conducted as the system performs in its real operating environment.

Field testing on an incomplete prototype always finds unexpected errors or undesirable side effects. Thus field trials on a knowledge based prototype can only be meaningful after experienced operators have worked with it long enough to have imparted sufficient local knowledge to it.

The windows program use may be an example from Borland's C Language.

What is claimed is:

1. A method of automated object identification and classification of objects and anomalies comprising the steps of:

capturing a pixel map of an image from a location containing a possible object or anomaly;

decomposing the pixel map into attributed primitives by tracing around edges of the object or anomaly, the primitives comprising numerical representations for a starting place, ending place, length, left and right texture attributes, angle of deviation from previous primitive, and curvature of the edges of the object;

combining adjacent primitives to form segments with width, length, number of vertices in segments and coordinates of vertices and angles between them;

storing separately primitive and segment values;

forming higher level descriptors with an object class from grouped segments representative of the objects and anomalies by determining a plurality of common characteristics including size, shape, average color, edge sharpness, solidity of texture and regularity of texture of the object or anomaly wherein the characteristics are represented numerically;

providing a knowledge base with a class category, each class category comprising a plurality of correctly classified samples of known objects and anomalies stored as sets of high level descriptors, with individual characteristics stored numerically; and numerically comparing the set of higher level descriptors of the object or anomaly to preclassified high level descriptors in a knowledge base by calculating a similarity function to determine the knowledge base class with the closest similarity to the high level descriptor of the object or anomaly.

2. The method of claim 1 further including the step of detecting repeatable and non-repeatable images.

3. The method of claim 2 wherein said non-repeatable image includes a sudden change in a straight line.

4. The method of claim 2 wherein said non-repeatable image includes an irregular angle.

5. The method of claim 2 wherein said non-repeatable image includes a vague edge.

6. The method of claim 2 wherein said step of detecting repeatable images further includes using area autocorrelation to find repeatable images.

7. The method of claim 2 wherein said step of detecting repeatable images further includes using block subtraction to find repeatable images.

8. The method of claim 1 wherein said object or anomaly is detected by comparison to a reference image and by image subtraction.

9. The method of claim 1 wherein the plurality of correctly classified samples may be deleted or added to a class at any time.

10. The method of claim 9 wherein said knowledge base has supervised learning wherein an expert assigns a class name to a set of example objects or anomalies and unsupervised learning wherein the system groups sets of examples objects or anomalies automatically.

11. The method of claim 1 wherein calculating the similarity function comprises calculating the inner product of a first descriptor and a second descriptor and dividing that result by the algebraic sum of the inner product of the first descriptor with itself, the inner product of the second descriptor with itself and subtracting the inner product of the first descriptor and the second descriptor.

12. The method of claim 11 wherein the maximum calculated similarity determines the classification of an image.

13. A method of detecting defects comprising the steps of:

capturing a pixel map of an image containing a possible defect;

decomposing and storing the pixel map into attributed primitives with starting point, ending point, length, angle of deviation from previous primitives, left and right texture attributes and a curvature;

combining adjacent primitives to form segments with width, length, number of vertices in segments and coordinates of vertices and angles between them;

storing separately primitive and segment values;

forming higher level descriptors with an object class from grouped segments representative of the defect by determining a plurality of common characteristics including size, shape, average color, edge sharpness, solidity of texture and regularity of texture of the defect the characteristics represented numerically; and numerically classifying defects by grouping defects with similar high level descriptors together.

14. A method of detecting defects comprising the steps of:

precisely locating and outlining a defect;

converting a defect image into high level descriptors by determining a plurality of common characteristics including size, shape, average color, edge sharpness, solidity of texture and regularity of texture of the defect, the characteristics determined numerically; and classifying without the use of a predetermined rule base said defect by calculating a similarity function which numerically compares the similarity between the higher level descriptors of the defect with higher level descriptors of preclassified defects stored in a knowledge-base with learned identity.

15. A method of automated object identification without using a reference image comprising the steps of:

capturing a pixel map of an image from a location where there is a possible object;

decomposing and storing without the use of a reference image said pixel map into attributed primitives with starting point, ending point, length, angle of deviation from previous primitives, left and right texture attributes and a curvature;

combining primitives to form segments with width, length, number of vertices in segments and coordinates of vertices and angles between them;

storing separately primitive and segment values;

forming higher level descriptors with an object class from grouped segments representative of the object by determining a plurality of common characteristics including size, shape, average color, edge sharpness, solidity of texture and regularity of texture of the object wherein the characteristics are represented numerically; and storing in a knowledge-base said higher level descriptors with a class category, the correct class category determined by numerically comparing the high level descriptors of the defect with high level descriptors of predefined exemplary defects.

16. A method of processing a digitized image to identify a portion of the digitized image, the method comprising the steps of:

decomposing the digitized image into image primitives by tracing around edges of objects in the image, the primitives comprising numerical representations for a starting place, ending place, length, left and right texture attributes, angle of deviation from previous primitive, and curvature of the edges of the object;

automatically producing from said image primitives a set of high level image descriptors for each object in the image by determining a plurality of common characteristics including size, shape, average color, edge sharpness, solidity of texture and regularity of texture of each object wherein the characteristics are represented numerically;

storing the high level descriptor of each object in a knowledge base;

comparing the high level image descriptors of each image with those of one or more known images represented by known object descriptors containing characteristics represented numerically in a knowledge base by numerically calculating a similarity function that best match the image descriptors; and identifying the portion of the digitized image areas of the known image having the best set of matching object descriptors.

17. The method of claim 16 further comprising the step of creating the knowledge base of object descriptors by:

(1) entering an explicit definition of image primitives of known objects to form the object descriptors, or (2) (a) creating a digitized image of a known object, and (b) decomposing the digitized image of the known object to form object descriptors.

18. A system for automatic object identification and classification comprising a computer and memory having;

a digital image file operable to store a plurality of pixel digital data and primitives, a knowledge base operable to store a high level description of a set of exemplary defects with individual characteristics stored numerically;

the computer and memory coupled to the knowledge base and the digital file, the computer operable to retrieve an image from the digital image file, to perform automatic object identification on the image, to generate high level descriptors for the object by determining a plurality of common characteristics including size, shape, average color, edge sharpness, solidity of texture and regularity of texture of the object, wherein the characteristics are represented numerically and to numerically compare the high level descriptors of the object with the descriptors stored in the knowledge base by calculating a similarity function.

19. The system of claim 18 wherein the computer and memory are further operable:

to create a pixel map of the image;

to decompose the pixel map into attributed primitives with a starting point, ending point, length, angle of deviation from previous primitives, left and right texture attributes and a curvature;

to combine the primitives to form segments with width, length, number of vertices in segments and coordinates of vertices and angles between them;

to store separately primitive and segment values.

* * * * *